(12) United States Patent
Xue et al.

(10) Patent No.: US 9,360,304 B2
(45) Date of Patent: Jun. 7, 2016

(54) METHOD FOR MEASURING VOLUMETRIC CHANGES OF OBJECT

(75) Inventors: Ziqiu Xue, Kyoto (JP); Yoshiaki Yamauchi, Hyogo (JP); Kinzo Kishida, Hyogo (JP)

(73) Assignees: RESEARCH INSTITUTE OF INNOVATIVE TECHNOLOGY FOR TH (JP); NEUBREX CO., LTD. (JP)

(*) Notice: Subject to any disclaimer, the term of this patent is extended or adjusted under 35 U.S.C. 154(b) by 0 days.

(21) Appl. No.: 14/419,514

(22) PCT Filed: Aug. 10, 2012

(86) PCT No.: PCT/JP2012/005113
§ 371 (c)(1),
(2), (4) Date: Feb. 4, 2015

(87) PCT Pub. No.: WO2014/024233
PCT Pub. Date: Feb. 13, 2014

(65) Prior Publication Data
US 2015/0219443 A1 Aug. 6, 2015

(51) Int. Cl.
*G01B 11/16* (2006.01)
*G01B 11/24* (2006.01)
*G01D 5/353* (2006.01)
*G01F 17/00* (2006.01)
*G01D 18/00* (2006.01)
*G01D 5/26* (2006.01)
(Continued)

(52) U.S. Cl.
CPC ............. *G01B 11/16* (2013.01); *G01B 11/18* (2013.01); *G01B 11/24* (2013.01); *G01D 5/268* (2013.01); *G01D 5/35361* (2013.01); *G01D 5/35364* (2013.01); *G01D 18/00* (2013.01);
(Continued)

(58) Field of Classification Search
None
See application file for complete search history.

(56) References Cited

U.S. PATENT DOCUMENTS

| 4,654,520 A | 3/1987 | Griffiths |
| 2008/0068586 A1 | 3/2008 | Kishida et al. |

(Continued)

FOREIGN PATENT DOCUMENTS

| JP | 63-210604 | 9/1988 |
| JP | 2003-270078 | 9/2003 |

(Continued)

OTHER PUBLICATIONS

International Search Report of Sep. 27, 2012, of PCT/JP2012/005113.

*Primary Examiner* — Gordon J Stock, Jr.
(74) *Attorney, Agent, or Firm* — Gerald E. Hespos; Michael J. Porco; Matthew T. Hespos

(57) ABSTRACT

Under a known pressure is externally applied to a reference member to which an optical fiber is fixed, test light is allowed to enter the optical fiber, and at least one of a reference Brillouin measurement for determining a reference Brillouin frequency shift amount based on the Brillouin scattering phenomenon, and a reference Rayleigh measurement for determining a reference Rayleigh frequency shift amount based on the Rayleigh scattering phenomenon is performed. A Brillouin measurement coefficient or a Rayleigh measurement coefficient is determined from these calculation results. An optical fiber is fixed to a sample member, the volumetric change of which is unknown, and the same sample Brillouin measurement or sample Rayleigh measurement is performed to determine the frequency shift amount. The volumetric change of the sample member is determined from the sample Brillouin or the sample Rayleigh frequency shift amount, and from the Brillouin or the Rayleigh measurement coefficient.

4 Claims, 16 Drawing Sheets

(51) Int. Cl.
 *G01V 8/16* (2006.01)
 *G01B 21/04* (2006.01)

(52) U.S. Cl.
 CPC ............... *G01F 17/00* (2013.01); *G01V 8/16* (2013.01); *G01B 21/042* (2013.01)

(56) References Cited

U.S. PATENT DOCUMENTS

2010/0033711 A1* 2/2010 Hayashi ............ G01D 5/35303
 356/73.1
2011/0228255 A1* 9/2011 Li ........................ G01B 11/18
 356/33
2015/0211900 A1* 7/2015 Xue ...................... G01K 11/32
 356/73.1

FOREIGN PATENT DOCUMENTS

| JP | 2004-279238 | | 10/2004 |
| JP | 2012225744 | A * | 11/2012 |
| WO | 2006/001701 | | 1/2006 |

* cited by examiner

| | A | B | C |
|---|---|---|---|
| FIRST DAY | 1 | 15 | 30 |
| SECOND DAY | 1 | 10 | 25 |
| THIRD DAY | 1 | 5 | 20 |

UNIT [MPa]

<PRESSURE PROFILE>

PRESSURE AND BULK MODULUS
(SAMPLE BRILLOUIN MEASUREMENT)

PRESSURE AND BULK MODULUS
(SAMPLE RAYLEIGH MEASUREMENT)

SANDSTONE LAYER

METHOD FOR MEASURING VOLUMETRIC CHANGES OF OBJECT

TECHNICAL FIELD

The present invention relates to a method for measuring volumetric changes of an object and distribution thereof, using the Brillouin frequency shift or Rayleigh frequency shift phenomenon of an optical fiber.

BACKGROUND ART

Various measuring methods using the Brillouin scattering phenomenon and the Rayleigh scattering phenomenon of an optical fiber are known (e.g. WO 2006/001071). An example is a distribution type pressure sensor, which uses the Brillouin frequency shift and Rayleigh frequency shift generated by applying strain (pressure) to an optical fiber. These frequency shifts depend on the strain applied to the optical fiber, hence the applied pressure can be measured by measuring the frequency shift amount.

This pressure measuring technique using an optical fiber can be applied to measuring the volumetric changes of an object. For example, porous sandstone, the volume of which changes between before and after liquid is filled, is one application field of this pressure measuring technique. Lately a technique to store carbon dioxide (CO2) underground is in-development as a countermeasure to global warming, and this pressure measuring technique can contribute to constructing a system to monitor the state of storing CO2 in sandstone when CO2 is stored underground, and a system to monitor the dynamic stability and safety of a caprock layer (e.g. pelitic rock), which is an upper layer above the sandstone layer.

However a method for accurately detecting, for example, the volumetric changes of sandstone constituted by an unknown composition that exists underground has not yet been proposed. It is possible to detect the changes of pressure at a spot if an electric pressure sensor is used. However it is impossible to specify whether these pressure changes are caused by the pressurized entry of fluid into the sandstone or by the volumetric changes of the sandstone.

SUMMARY OF INVENTION

It is an object of the present invention to provide a method for measuring the volumetric changes of an object, which can accurately measure the volumetric changes and distribution thereof of an object of which degree of volumetric changes and distribution thereof are unknown.

A method for measuring the volumetric changes of an object according to an aspect of the present invention to achieve the object of the invention includes: a step of fixing an optical fiber to a reference member, the volumetric change of which is known, so as to follow deformation of the reference member when pressure is externally applied to the reference member; a step of allowing test light to enter the optical fiber in a state of externally applying a known pressure to the reference member to which the optical fiber is fixed, and performing at least one of a reference Brillouin measurement for determining a reference Brillouin frequency shift amount based on the Brillouin scattering phenomenon, and a reference Raleigh measurement for determining a reference Rayleigh frequency shift amount based on the Rayleigh scattering phenomenon; a step of determining, from the result of the reference Brillouin measurement or the reference Rayleigh measurement, a Brillouin measurement coefficient or a Rayleigh measurement coefficient based on the relationship between the volumetric change and the frequency shift amount per unit pressure in each measurement; a step of fixing an optical fiber to a sample member, the volumetric change of which is unknown, so as to follow the deformation of the sample member when pressure is externally applied to the sample member; a step of allowing test light to enter the optical fiber in a state of externally applying a known pressure to the sample member to which the optical fiber is fixed, and performing at least one of a sample Brillouin measurement for determining a sample Brillouin frequency shift amount based on the Brillouin scattering phenomenon, and a sample Rayleigh measurement for determining a sample Rayleigh frequency shift amount based on the Rayleigh scattering phenomenon; and a step of determining the volumetric changes of the sample member from the sample Brillouin frequency shift amount or the sample Rayleigh frequency shift amount, and the Brillouin measurement coefficient or the Rayleigh measurement coefficient.

The object, features and advantages of the present invention will be more apparent upon reading the following detailed description along with the accompanying drawings.

DESCRIPTION OF EMBODIMENTS

Figure 1:
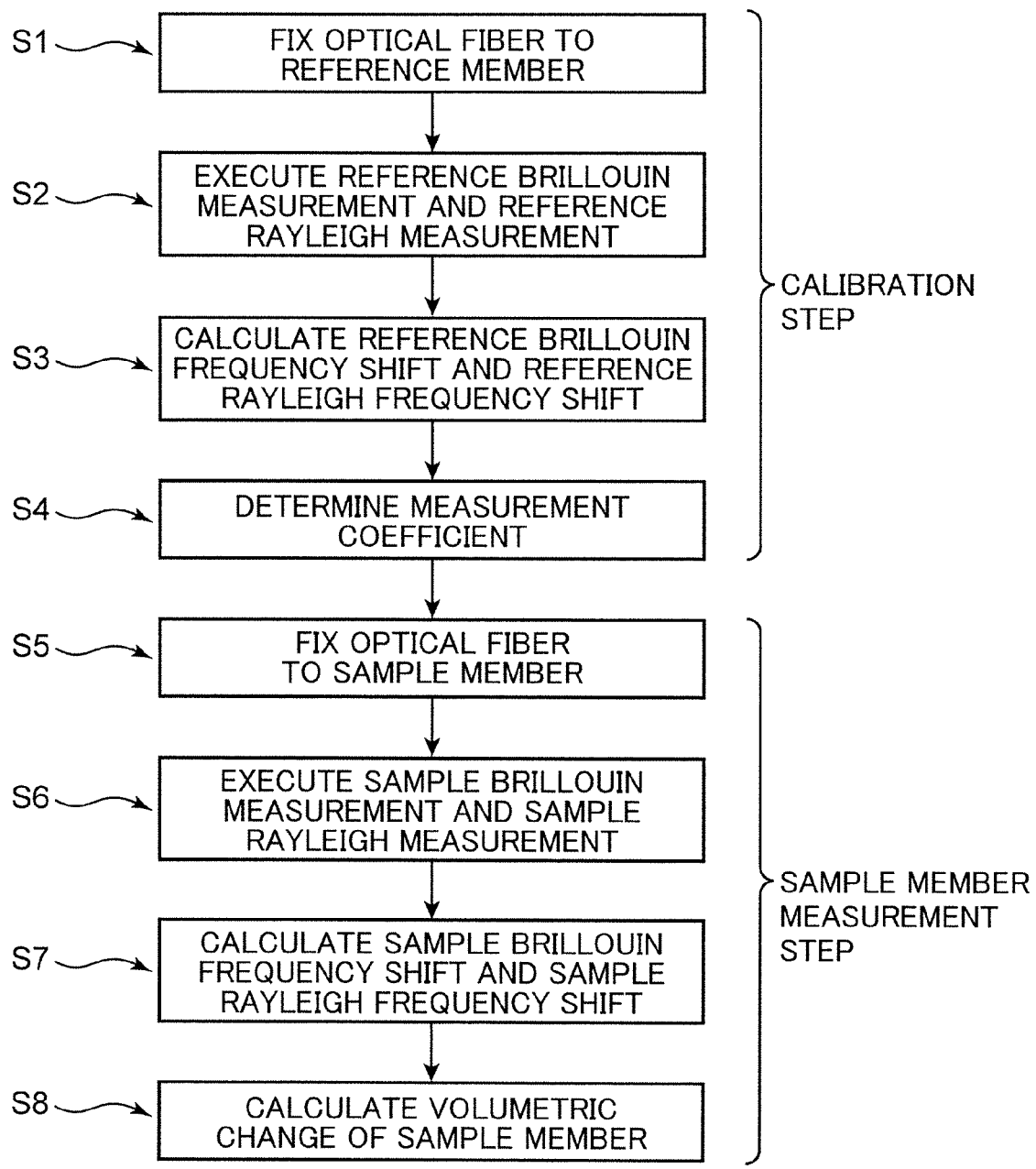
FIG. 1 is a flow chart showing a general procedure of a method for measuring the volumetric changes according to the present invention.

Embodiments of the present invention will now be described with reference to the drawings. FIG. 1 is a flow chart indicating a general procedure of a method for measuring volumetric changes according to an embodiment of the present invention. The method for measuring volumetric changes according to this embodiment includes, in general, a "calibration step" in which the Brillouin measurement and the Rayleigh measurement are performed with fixing an optical fiber to a reference member, the volumetric change of which is known, measurement coefficients are determined, and a "sample member measurement step" in which the Brillouin measurement and the Rayleigh measurement are performed with fixing an optical fiber to a sample member, the volumetric change of which is unknown, using the measurement coefficients, and the volumetric change of the sample member is calculated.

The calibration step includes a step of fixing an optical fiber to the reference member (step S1), a step of executing the reference Brillouin measurement and the reference Rayleigh measurement (step S2), a step of determining the reference Brillouin frequency shift amount and the reference Rayleigh frequency shift amount (step S3), and a step of determining the Brillouin measurement coefficient or the Rayleigh measurement coefficient (step S4). The sample member measurement step includes a step of fixing an optical fiber to the sample member (step S5), a step of executing the sample Brillouin measurement and the sample Rayleigh measurement (step S6), a step of determining the sample Brillouin frequency shift amount and the sample Rayleigh frequency shift amount (step S7), and a step of calculating the volumetric change of the sample member (step S8). The measurement principle of the method for measuring volumetric changes according to this embodiment and each step mentioned above will now be described in detail.

<Measurement Principle>

When light enters an optical fiber and scattered light thereof is analyzed based on the frequency, Rayleigh scattered light of which frequency is approximately the same as that of the incident light, Raman scattered light of which frequency is quite different from that of the incident light, and Brillouin scattered light of which frequency is different from that of the incident light by several to several tens GHz are observed. The Brillouin scattering phenomenon is a phenomenon in which power is transferred via acoustic phonons in an optical fiber when the light enters the optical fiber. The frequency difference between the incident light and the Brillouin scattered light is called "Brillouin frequency shift", and the Brillouin frequency shift is in proportion to the sound velocity inside the optical fiber, and this sound velocity depends on the strain and temperature of the optical fiber. Therefore by measuring the Brillouin frequency shift, the strain applied to the optical fiber and/or the temperature can be measured.

The Raleigh scattering phenomenon is a scattering phenomenon generated when the light is scattered by the fluctuation of the refractive index in the optical fiber. The frequency difference between the incident light and the Rayleigh scattered light is the Rayleigh frequency shift. The Rayleigh frequency shift also changes depending on the strain applied to the optical fiber and/or the temperature.

(Calibration Step)

When the temperature is constant, the Brillouin frequency shift amount $\Delta v_B$ and the Rayleigh frequency shift amount $\Delta v_R$ of the optical fiber, to which pressure change $\Delta P$ is applied, are given by the following Expressions (1) and (2).

$$\Delta v_S = \alpha_S \cdot \Delta P + \beta_R \cdot \Delta e = \alpha_B \cdot \Delta P + \beta' C_{11} \cdot \Delta e \quad (1)$$

$$\Delta v_R = \alpha_R \cdot \Delta P + \beta_R \cdot \Delta e = \alpha_R \cdot \Delta P + \beta' C_{21} \cdot \Delta e \quad (2)$$

In Expressions (1) and (2), subscripts "B" and "R" denote the Brillouin measurement and the Rayleigh measurement respectively. $\Delta e$ denotes an increment of the volumetric strain (volumetric expansion rate), $\alpha_B$ denotes the Brillouin measurement coefficient, $\alpha_R$ denotes the Rayleigh measurement coefficient, and $\beta'$ denotes a coefficient, which is commonly applied to both the Brillouin measurement and the Rayleigh measurement and is determined by a calibration test for a material of which bulk modulus is known. $C_{11}$ denotes a strain sensitivity coefficient of the Brillouin measurement (=0.0507 MHz/µε), and $C_{21}$ denotes a strain sensitivity coefficient of the Rayleigh measurement (=−0.155 GHz/µε).

The following Expression (3) is established for a linear material of which bulk modulus K is kept constant with respect to the pressure change $\Delta P$.

$$K = -\frac{dP}{de} = -\frac{\Delta P}{\Delta e} = \text{const.} \quad (3)$$

In this case, the Brillouin frequency shift amount $\Delta v_B$ and the Rayleigh frequency shift amount $\Delta v_R$ given by Expressions (1) and (2) can be transformed as shown in the following Expressions (4) and (5).

$$\Delta v_B = \left(\alpha_B - \beta' C_{11} \frac{1}{K}\right) \Delta P \quad (4)$$

$$\Delta V_R = \left(\alpha_R - \beta' C_{21} \frac{1}{K}\right) \Delta P \quad (5)$$

Therefore as the calibration test, a pressure load test is performed on a plurality of materials of which bulk modulus K is known. Then the values of $\Delta v B/\Delta P$ and $\Delta v R/\Delta P$ are plotted for the reverse number 1/K of the bulk modulus. These results are linearly approximated, and the Brillouin measurement coefficient $\alpha B$, the Rayleigh measurement coefficient $\alpha R$ and the common coefficient $\beta'$ are determined by the inclination and intercept of the approximate line.

Here the increment $\Delta e$ of the volumetric strain and the bulk modulus K are the physical properties of the base material (later mentioned reference member or sample member) to which an optical fiber is fixed. It is assumed that when pressure is applied to an optical fiber, the optical fiber is fixed to the base material so as to follow and change with the base material, and if the base material shrinks or expands under an environment where pressure changes, the optical fiber can follow and deform according to the deformation of the base material.

(Sample Member Measurement Step)

If the Brillouin measurement coefficient $\alpha_B$, the Rayleigh measurement coefficient $\alpha_R$ and the common coefficient $\beta'$ are determined in advance by the above calibration test, then the volumetric change, that is, the increment Δe of volumetric strain and the bulk modulus K, of the base material (sample member) of which bulk modulus is unknown, can be determined by performing the Brillouin measurement and/or the Rayleigh measurement. The bulk modulus K is not always kept constant with respect to the pressure change ΔP for all the materials of which bulk modulus K is unknown, so the following calculation expressions are used.

Based on Expressions (1) to (5), the increment Δe of volumetric strain is given by the following Expression (6).

$$\Delta e = \frac{1}{\beta' C_{11}} \left( \frac{dv_B}{dP} - \alpha_B \right) \Delta P = \frac{1}{\beta' C_{21}} \left( \frac{dv_R}{dP} - \alpha_R \right) \Delta P \quad (6)$$

It is assumed that the pressure in the reference state is $P_0$, and the pressure changes from $P_0$ to a certain pressure P. If Expression (6) is integrated with the pressure $P_0$ to pressure P, the following Expression (7) is established.

$$e(P) = \frac{1}{\beta' C_{11}} \{v_B(P) - v_B(P_0) - \alpha_B(P - P_0)\} + e(P_0) = \quad (7)$$

$$\frac{1}{\beta' C_{21}} \{v_R(P) - v_R(P_0) - \alpha_R(P - P_0)\} + e(P_0)$$

Since the definition of the volumetric strain is expressed by K=−(dP/de), the bulk modulus K is given by the following Expression (8).

$$K = \frac{\beta' C_{11}}{\alpha_B - \frac{dv_B}{dP}} = \frac{\beta' C_{21}}{\alpha_R - \frac{dv_R}{dP}} \quad (8)$$

In Expression (7), dvB/dP and dvR/dP can be determined by function fitting (e.g. cubic polynomial) of the pressure applied to the sample member, the calculation results of the Rayleigh frequency shift and the Brillouin frequency shift, and by differentiating the functions.

For example, the bulk modulus of a porous sandstone changes depending on whether liquid is filled into the porous sandstone or not. Further, a sandstone is normally a heterogeneous material, as a result the actual storage state of CO2 is uneven. This unevenness appears as a spatial distribution of the bulk modulus of the sandstone. This means that if an optical fiber is set in the storage stratum of CO2 and the Brillouin measurement and/or Rayleigh measurement is/are performed on this optical fiber, the storage state of $CO_2$ in this storage stratum can be monitored.

<Step S1>

Figure 2:
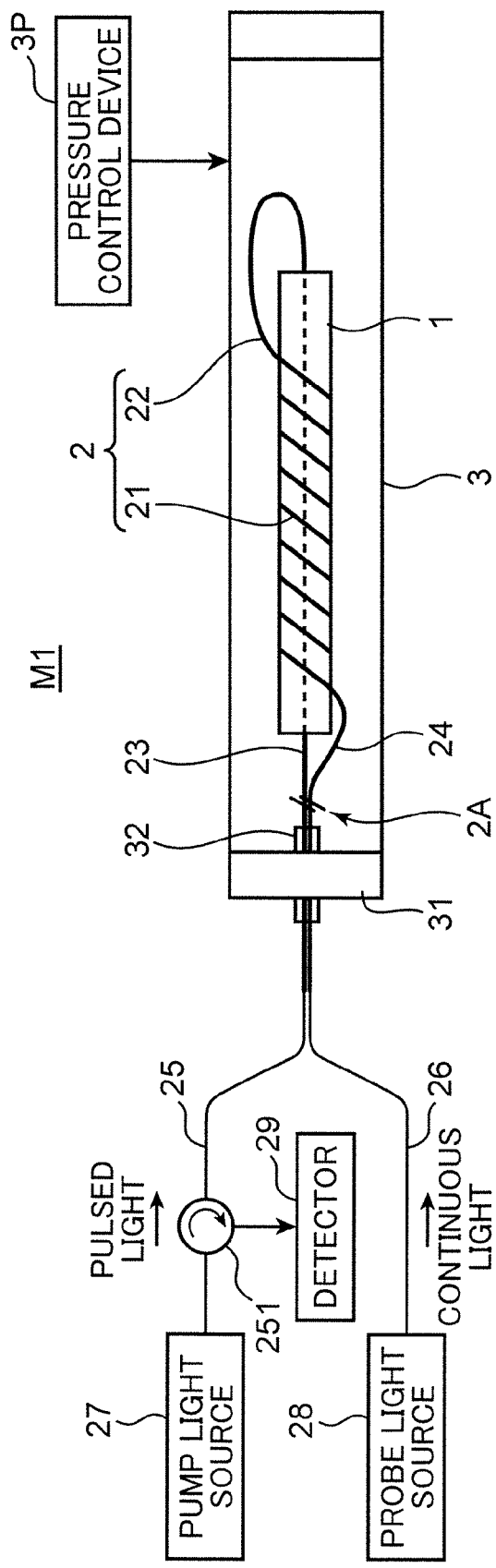
FIG. 2 is a schematic diagram depicting a system for measuring a reference member, which is executed in a calibration step.

FIG. 2 is a schematic diagram depicting a measurement system M1 of the reference member 1 used in the calibration step. In step S1, the measurement target optical fiber 2 is fixed to the reference member 1, the volumetric change of which is known. For this reference member 1, a cylindrical metal member can be used. In this embodiment, an aluminum (Al) circular tube and a stainless steel (SUS) circular tube are used. For the optical fiber 2, a fiber core, which has a UV coat layer on a quartz fiber element wire that includes a core and clad, is used.

A part of the measurement target optical fiber 2 is wound in a spiral form on a circumferential surface of the reference member 1, and another part thereof is separated from the reference member 1 so as not to be influenced by the pressure from the reference member 1. Thereby a wound portion 21 and a free-fiber portion 22, which is not constrained by the reference member 1, are formed in the measurement target optical fiber 2. A first lead optical fiber 25 is fused to a first end 23 of the measurement target optical fiber 2, and a second lead optical fiber 26 is fused to a second end 24 of the measurement target optical fiber 2 at a fusing portion 2A respectively.

In the wound portion 21, the measurement target optical fiber 2 is wound around the circumferential surface of the reference member 1 with a predetermined tension, and is firmly adhered to the surface using epoxy adhesive or the like, so as to follow the deformation of the reference member 1 that is generated when a pressure is externally applied to the reference member 1. The outer diameter of the reference member 1 is sufficiently larger than the outer diameter of the measurement target optical fiber 2. If the outer diameter of the reference member 1 decreases under a high pressure environment, the wound portion 21 shrinks accordingly, so that the inner diameter of the wound portion 21 becomes the same as the outer diameter of the reference member 1 after the shrinkage. By forming the wound portion 21 in this way, the pressure due to the volumetric change of the reference member 1 appropriately applied to the measurement target optical fiber 2 and the pressure change is accurately reflected in the Brillouin measurement and the Raleigh measurement. On the other hand, no tension is applied to the free-fiber portion 22 so that the Brillouin frequency shift amount and the Rayleigh frequency shift amount, solely due to the external pressure on the measurement target optical fiber 2, can be measured.

The reference member 1 and the measurement target optical fiber 2 are enclosed in a cylindrical pressure vessel 3. The pressure vessel 3 is a chamber in which, for example, a pressure environment in a 1 to 50 MPa range can be formed, and a pressure control device 3P, to control pressure in the chamber, is attached. A pressure bulk head 31 is disposed at the opening of the pressure vessel 3. In the pressure bulk head 31, a feed through 32 penetrates to hold the first and second lead optical fibers 25 and 26.

<Step S2>

In a state where the reference member 1 and the measurement target optical fiber 2, of which a part (wound portion 21) is fixed to the reference member 1, are sealed in the pressure vessel 3, and a known pressure is applied to the reference member 1 and the measurement target optical fiber 2, test light is allowed to enter the measurement target optical fiber 2, and the reference Brillouin measurement to determine the reference Brillouin frequency shift amount based on the Brillouin scattering phenomenon, and the reference Rayleigh measurement to determine the reference Rayleigh frequency shift amount based on the Rayleigh scattering phenomenon are executed. The temperature is constant at 30° C.

As shown in FIG. 2, for the reference Brillouin measurement and the reference Rayleigh measurement, a pump light source 27 and a detector 29 are connected to the end of the first lead optical fiber 25 via a circulator 251, and a probe light source 28 is connected to the end of the second lead optical fiber 26. The measurement target optical fiber 2 is used for both the reference Brillouin measurement and the reference Rayleigh measurement.

The pump light source 27, which includes a semiconductor laser or the like as a light source, generates pump light which is a pulsed light. This pump light is allowed to enter a first end 23 of the measurement target optical fiber 2 via the first lead optical fiber 25. The probe light source 28, which includes a semiconductor laser or the like as a light source, generates a probe light which is a continuous light. This pump light is allowed to enter a second end 24 of the measurement target optical fiber 2 via the second lead optical fiber 26.

The detector 29, which includes a light receiving element, receives light that is influenced by the stimulated Brillouin scattering phenomenon (stimulated Brillouin scattered light) or light that is influenced by the Rayleigh scattering phenomenon (Rayleigh back-scattered light) in the measurement target optical fiber 2. The detector 29 also includes a processing unit, and performs an operation to determine the reference Brillouin frequency shift amount and the reference Rayleigh frequency shift amount by analyzing the spectrum of the stimulated Brillouin scattered light and the Rayleigh back-scattered light. The circulator 251 separates the return light from the measurement target optical fiber 2 to the first lead optical fiber 25, and allows the return light to enter the detector 29.

When the measurement system M1 performs the reference Brillouin measurement, the pump light source 27 generates a main light pulse and a sub-light pulse, and allows these light pulses to enter the first end 23 of the measurement target optical fiber 2 as the pump light. The probe light source 28 allows the probe light, which is a continuous light, to enter the second end 24 of the measurement target optical fiber 2. The main light pulse functions to transfer the energy scattered by acoustic phonons in the measurement target optical fiber 2 to the probe light, and the sub-light pulse functions to excite the acoustic phonons for the main light pulse. In this case, the detector 29 detects the stimulated Brillouin scattered light.

When the measurement system M1 performs the reference Rayleigh measurement, on the other hand, the pump light source 27 generates one type of pulsed light, and allows the pulsed light to enter the first end 23 of the measurement target optical fiber 2. The probe light source 28 is not used. In this case, the detector 29 detects the Rayleigh back-scattered light.

Figures 3A, 3B:
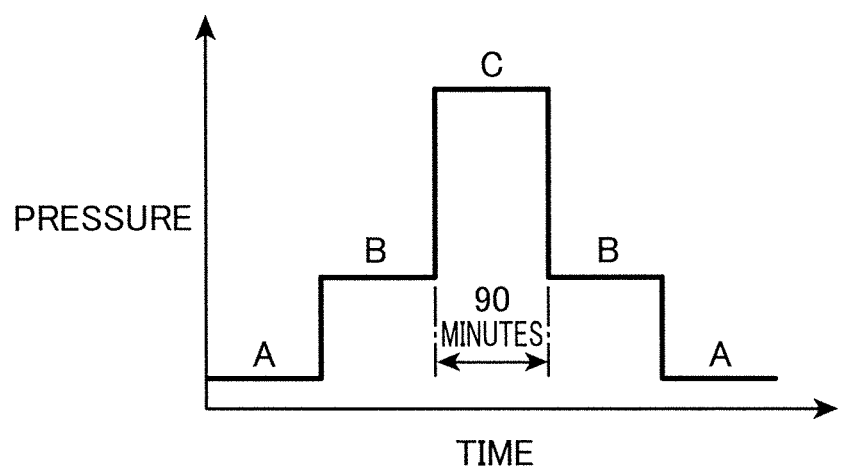
FIG. 3A and FIG. 3B show a pressure applying pattern in the measurement system in FIG. 2.

When the reference Brillouin measurement and the reference Rayleigh measurement are performed, the pressure control device 3P controls the internal pressure of the pressure vessel 3. FIG. 3 shows an example of pressure control, where FIG. 3A shows the pressure change pattern and FIG. 3B shows the pressure which is applied in each period. As FIG. 3A shows, in one example of the preferred pressure control, a low pressure period A, an intermediate pressure period B and a high pressure period C are defined, each unit period is set to 90 minutes, and the pressure is changed in the sequence of low pressure period A→intermediate pressure period B→high pressure period C→intermediate pressure period B→low pressure period A. As FIG. 3B shows, the pressure in the low pressure period A is 1 MPa, the pressure levels of the intermediate pressure period B and the high pressure period C are changed on the first day, the second day and the third day respectively. Therefore in the period from 1 MPa to 30 MPa, the reference Brillouin measurement and the reference Rayleigh measurement can be performed at every 5 MPa in a 1 MPa to 30 MPa range. In each unit period, 90 minutes of sustaining time is taken, so as to stabilize the response of the optical fiber 2 to pressure.

It is preferable to perform the reference Brillouin measurement and the reference Rayleigh measurement a plurality of times, using different materials for the reference member 1. In this embodiment, the reference Brillouin measurement and the reference Rayleigh measurement were performed using two types of circular tubes: aluminum and stainless steel.

<Step S3>

In the reference Brillouin measurement under each known pressure, the detector 29 determines the Brillouin spectrum of each area portion of the measurement target optical fiber 2 in the longitudinal direction respectively, by detecting the stimulated Brillion scattered light. Then based on the Brillouin spectrum of each area portion, the Brillouin frequency shift amount of each area portion is determined respectively. Further, in the reference Rayleigh measurement under each pressure, the detector 29 determines the Rayleigh spectrum of each area portion of the measurement target optical fiber 2 in the longitudinal direction respectively based on the Rayleigh back-scattered light. Then based on the Rayleigh spectrum of each area portion, the Rayleigh frequency shift amount of each area portion is determined respectively.

Figure 4:
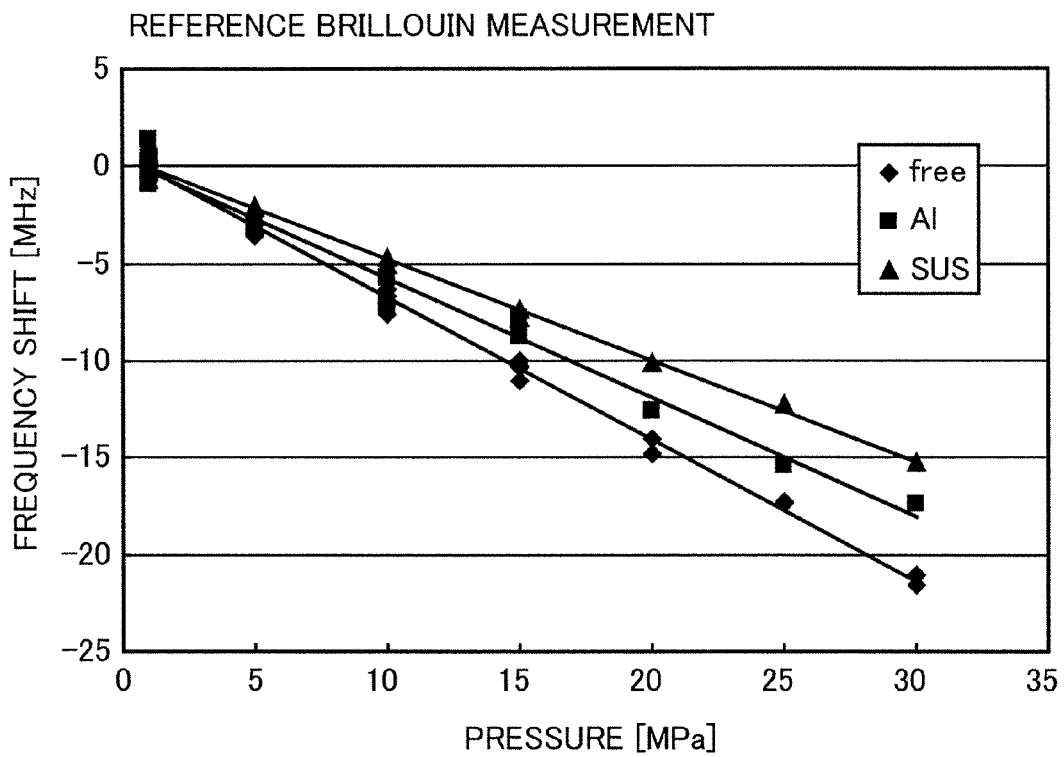
FIG. 4 is a graph showing a result of the reference Brillouin measurement.

FIG. 4 shows the Brillouin frequency shift amount acquired in the reference Brillouin measurement between 1 MPa to 30 MPa. In FIG. 4, the plotting of "Al" indicates the Brillouin frequency shift amount of the wound portion 21 of the measurement target optical fiber 2 when an aluminum circular tube is used as the reference member 1. The plot of "SUS" indicates the Brillouin frequency shift amount of the wound portion 21 of the measurement target optical fiber 2 when the stainless steel circular tube is used as the reference member 1. The plot of "free" indicates the Brillouin frequency shift amount of the free-fiber portion 22 of the measurement target optical fiber 2. As obvious from FIG. 4, the Brillouin frequency shift amount responds linearly in the "negative" direction with respect to pressure in all cases of the wound portion 21 on the aluminum circular tube, the wound portion 21 on the stainless steel circular tube, and the free-fiber portion 22. The response to pressure is highest in the free-fiber portion 22.

Figure 5:
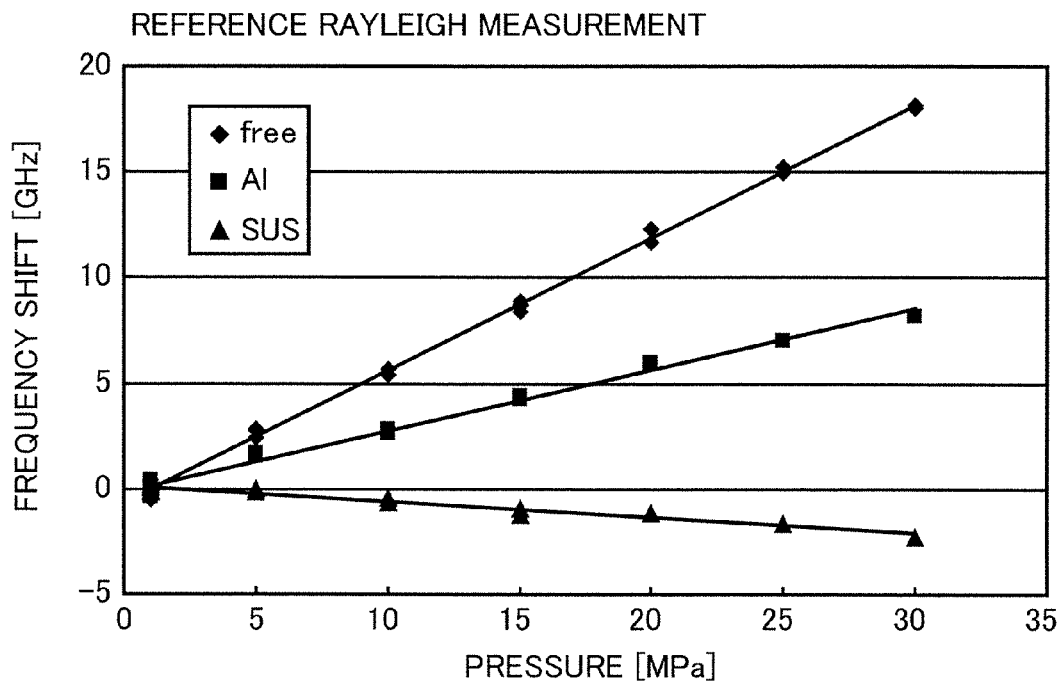
FIG. 5 is a graph showing a result of the reference Rayleigh measurement.

FIG. 5 shows the Rayleigh frequency shift amount acquired in the reference Rayleigh measurement between 1 MPa to 30 MPa. In FIG. 5, the plot of "Al", "SUS" and "free" are the same as in the case of FIG. 4. As obvious from FIG. 5, the Rayleigh frequency shift amount responds linearly in the "positive" direction with respect to pressure in the case of the free-fiber portion 22 and the wound portion 21 on the aluminum circular tube, but the Rayleigh frequency shift amount responds linearly in the "negative" direction with respect to the pressure in the case of the wound portion 21 on the stainless steel circular tube. In the reference Rayleigh measurement as well, the response to pressure is highest in the free-fiber portion 22. The relationship between the pressure and the Rayleigh frequency shift changes in the "positive" direction or the "negative" direction depending on the material of the reference member 1, which means that the volumetric changes of various objects can be identified by detecting both the Brillouin frequency shift amount and the Rayleigh frequency shift amount.

<Step S4>

From the results of the reference Brillouin measurement and the reference Rayleigh measurement in step S3, the Brillouin measurement coefficient or the Rayleigh measurement coefficient is determined based on the relationship between the volumetric change and the frequency shift amount per unit pressure in each measurement. In this embodiment, the coefficient is determined using three types of pressure: pressure in the wound portion 21 on the aluminum circular tube; pressure in the wound portion 21 on the stainless steel circular type; pressure in the free-fiber portion 22 and the Brillouin and Rayleigh frequency shifts.

Figure 6:
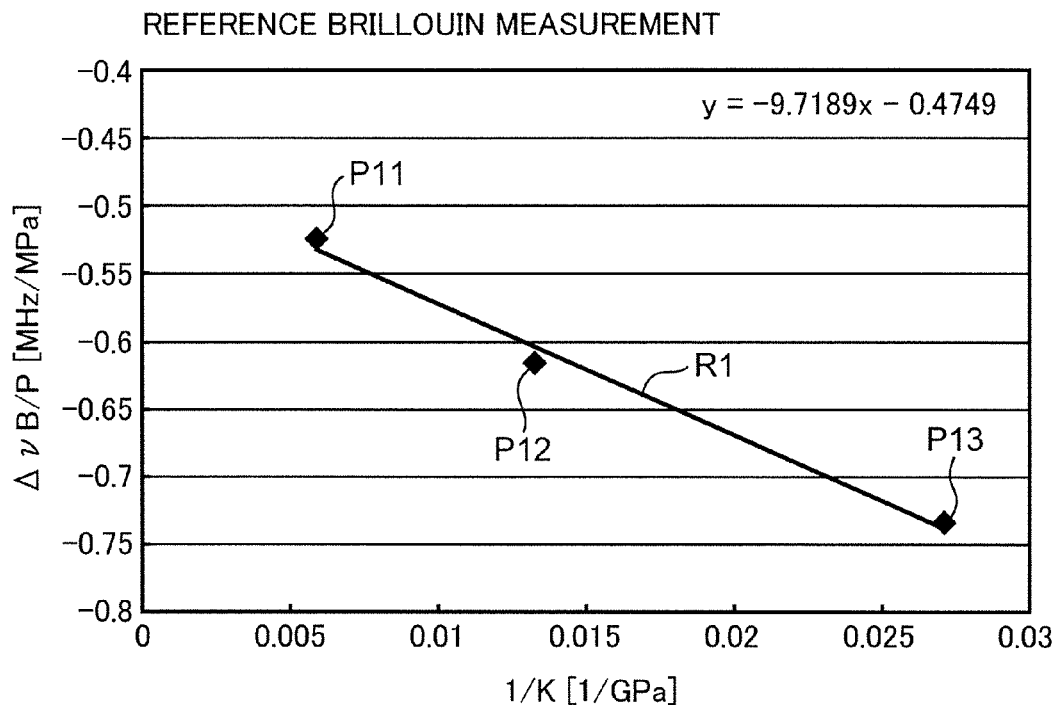
FIG. 6 is a graph for explaining a Brillouin measurement coefficient determined by the reference Brillouin measurement.

FIG. 6 is a graph for determining the Brillouin measurement coefficient acquired from the result of the reference Brillouin measurement. The abscissa of the graph in FIG. 6 is an inverse number of the bulk modulus K, and the ordinate is the frequency shift amount per unit pressure derived from the graph in FIG. 4. The bulk modulus of aluminum is 75.5 [GPa], the bulk modulus of stainless steel is 160 [GPa], and the bulk modulus of quartz, which is a constituent of the measurement target optical fiber 2, is 36.9 [GPa]. Therefore the plot P11 in FIG. 6 indicates the plot of the wound portion 21 on the stainless steel circular tube, P12 indicates the plot of the wound portion 21 on the aluminum circular tube, and P13 indicates the plot of the free-fiber portion 22.

Figure 7:
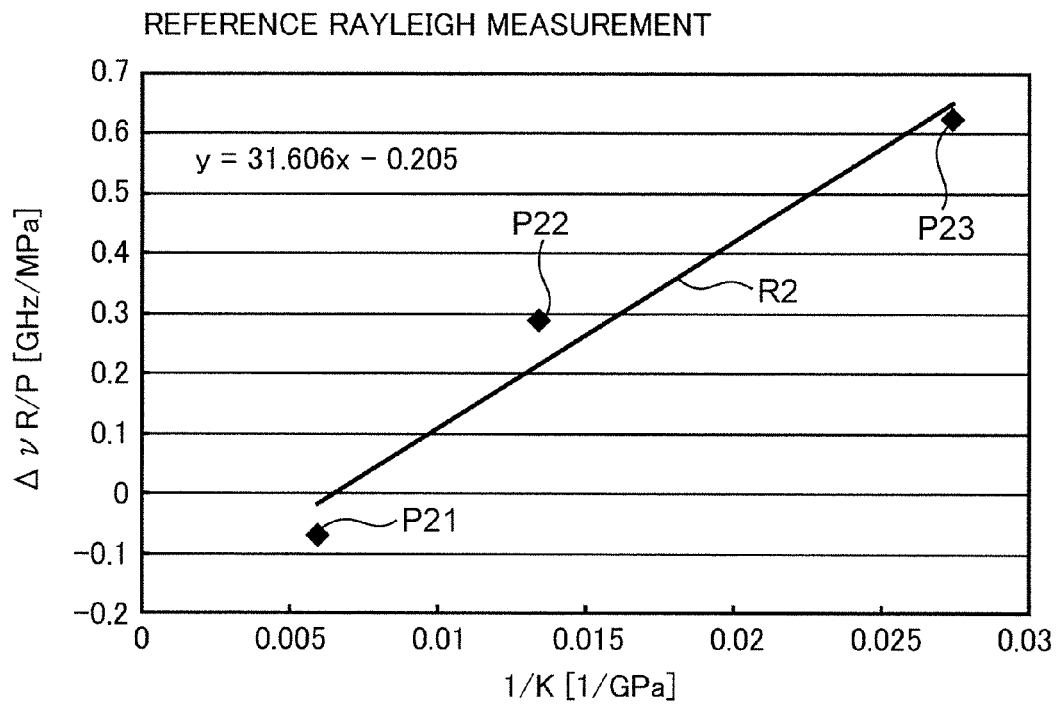
FIG. 7 is a graph for explaining a Rayleigh measurement coefficient determined by the reference Rayleigh measurement.

FIG. 7 is a graph for determining the Raleigh measurement coefficient acquired from the result of the reference Rayleigh measurement. The abscissa of the graph in FIG. 7 is an inverse number of the bulk modulus, and the ordinate is the frequency shift amount per unit pressure derived from the graph in FIG. 5. Just like FIG. 6, the plot P21 in FIG. 7 indicates the plot of the wound portion 21 on the stainless steel circular tube. Plot P22 indicates the plot of the wound portion 21 on the aluminum circular tube, and the plot P23 indicates the plot of the free-fiber portion 22.

From the results in FIG. 6 and FIG. 7, the Brillouin measurement coefficient $\alpha_B$, the Rayleigh measurement coefficient $\alpha_R$, and the common coefficient $\beta'$ are derived. An approximate line R1 in FIG. 6, that indicates the correlation of the reference Brillouin frequency shift amount per unit pressure and the inverse number of the bulk modulus K, can be expressed as a linear function using the following Expression (9), and the approximate line R2 in FIG. 7, that indicates the correlation of the reference Rayleigh frequency shift amount per unit pressure and the inverse number of the bulk modulus K, can be expressed as a linear function using the following Expression (10).

$$y = -9.719x - 0.475 \quad (9)$$

$$y = 31.606x - 0.235 \quad (10)$$

The Brillouin measurement coefficient $\alpha B$ is an intercept of Expression (9), which is −0.475, and the Rayleigh measurement coefficient $\alpha R$ is an intercept of Expression (9), which is −0.205. The common coefficient $\beta'$ can be determined by dividing the inclination of Expression (10), which is −9.719, by a strain sensitivity coefficient C11 (=0.0507 MHz/$\mu\epsilon$) of the Brillouin measurement, or by dividing the inclination of Expression (10), which is 31.606, by a strain sensitivity coefficient C21 (=0.155 GHz/$\mu\epsilon$) of the Rayleigh measurement. The calculation results are common coefficient $\beta'$ of the Brillouin measurement=0.192×106, and common coefficient $\beta'$ of the Rayleigh measurement=0.204×106. "106" of the common coefficient $\beta'$ is a multiplier for adjusting units, and can be regarded as approximately "0.2" for both cases.

The common coefficient $\beta'$ is a ratio of strain that the measurement target optical fiber 2 receives from the reference member 1. According to the above calculation example, the measurement target optical fiber 2 receives 20% of the volumetric strain of the reference member 1. The volumetric strain e is given by the sum of the strains on three axes: x, y and z axes ($e = \epsilon x + \epsilon y + \epsilon z$). The quartz glass type optical fiber responds only to the strain in the direction along the longitudinal direction thereof. Therefore if the reference member 1 is an isotropic material and the measurement target optical fiber 2 also deforms isotropically, then in theory the measurement target optical fiber 2 should receive ⅓ of the volumetric strain e of the reference member 1 ($\beta'=0.333$). However according to experiments by the present inventors, the ratio of the strain that is received is not ⅓ but ⅕, and the value virtually makes no difference between the Brillouin measurement and the Rayleigh measurement. At the moment the cause for this is not certain.

Now the constants of Expression (8) are all determined. In other words, the Brillouin measurement coefficient $\alpha_B$=−0.475 [MHz/MPa], the Rayleigh measurement coefficient $\alpha_R$=−0.205 [GHz/MPa], the common coefficient $\beta'$=0.2×10⁶, the strain sensitivity coefficient $C_{11}$ of the Brillouin measurement=0.0507 [MHz/$\mu\epsilon$], and the strain sensitivity coefficient $C_{21}$ of the Rayleigh measurement=−0.155 [GHz/$\mu\epsilon$].

Therefore if the Brillouin frequency shift amount $\Delta v_B$ and the Rayleigh frequency shift amount $\Delta v_R$ are determined by applying a known pressure P, then the volumetric strain e and the bulk modulus K can be determined for the sample member, the volumetric change of which is unknown.

<Step S5>

Figure 8:
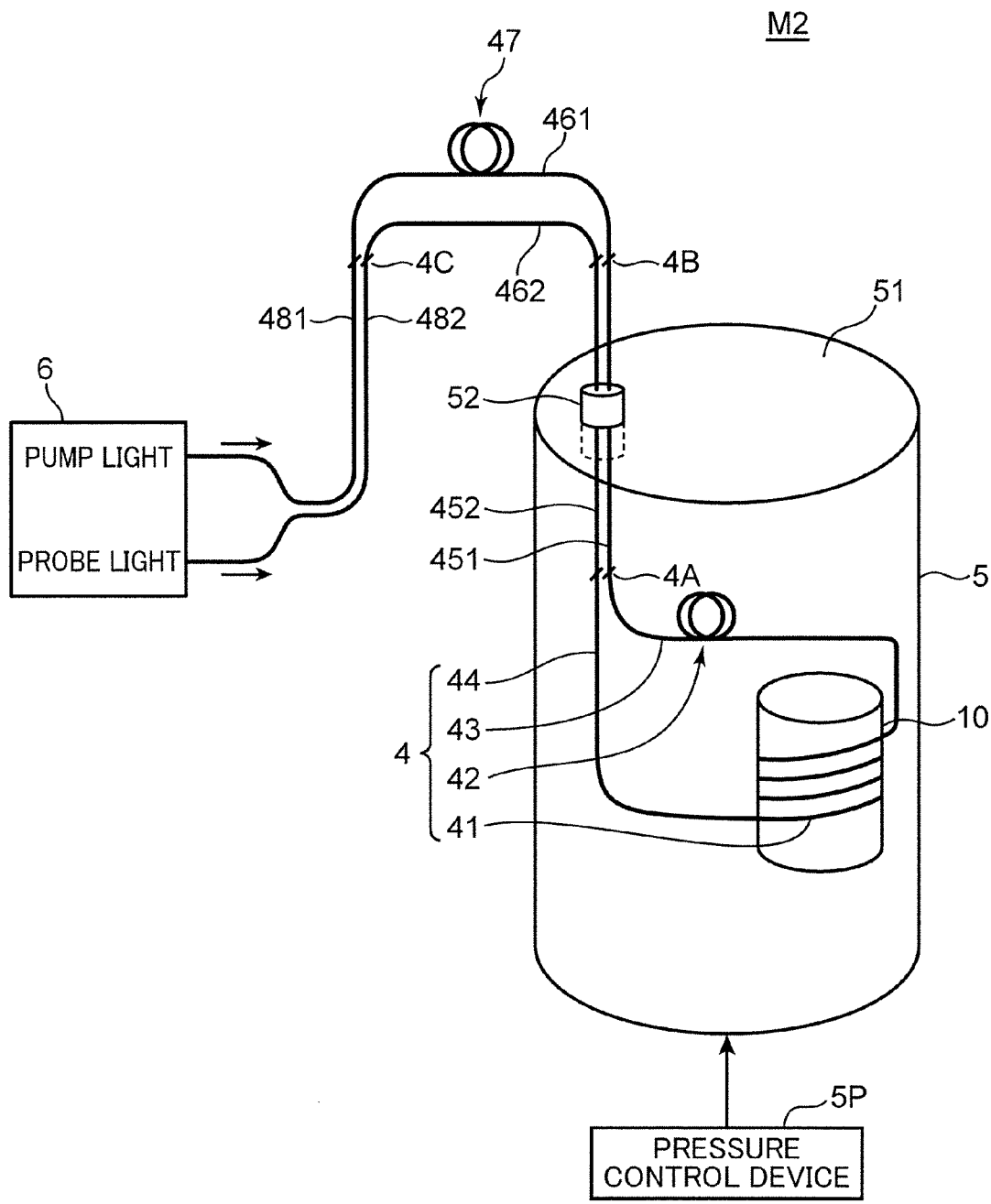
FIG. 8 is a schematic diagram depicting a system for measuring a sample member, which is executed in the measurement step.

The sample member measurement step is performed next. FIG. 8 is a schematic diagram depicting a measurement system M2 to measure a sample member 10, which is executed in the measurement step. Here a measurement target optical fiber 4 is fixed to the sample member 10, the volumetric change of which is unknown, so as to follow the deformation of the sample member 10 when pressure is externally applied to the sample member 10. The optical fiber 4 used here is the same as the measurement target optical fiber 2 used in the calibration step described above. The sample member 10 used in this embodiment is a sandstone sample having voids inside, which was extracted in a cylindrical shape.

Figure 9:
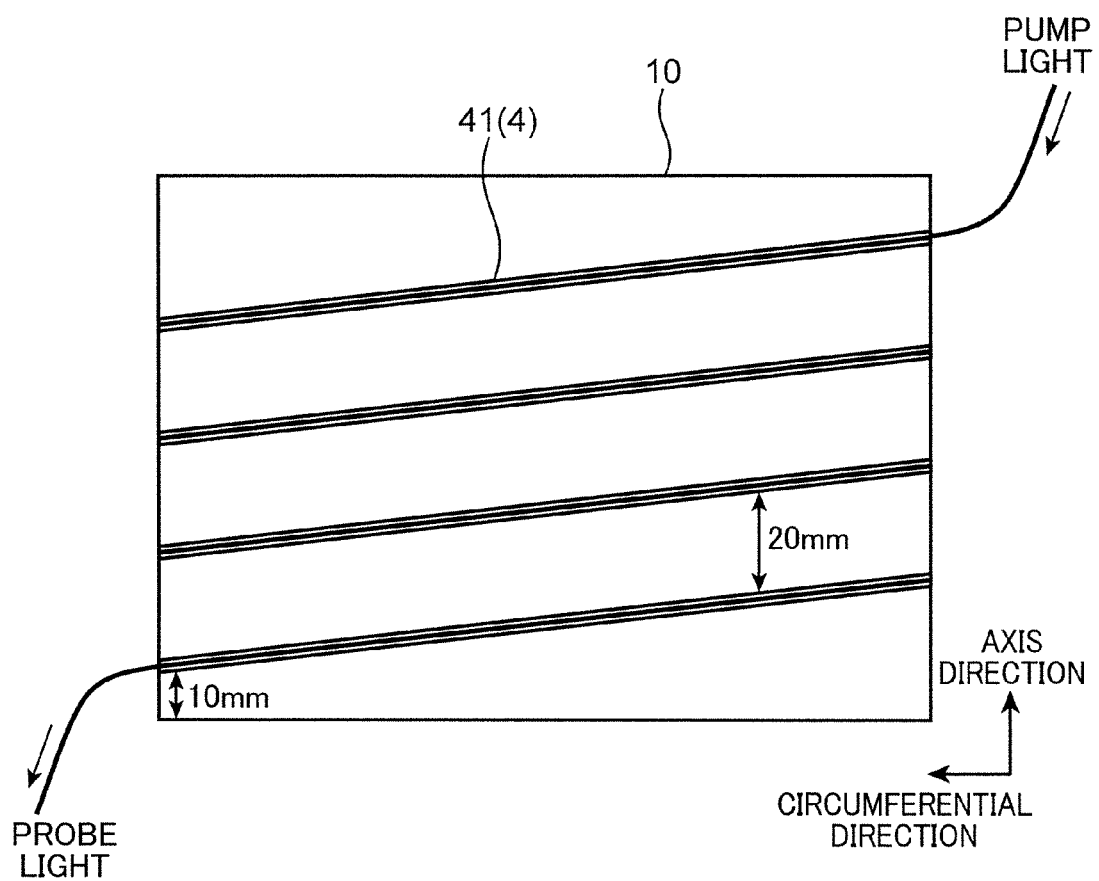
FIG. 9 is a schematic diagram depicting a state of fixing the optical state to the sample member.

A part of the measurement target optical fiber 4 is wound around the circumferential surface of the sample member 10 in a spiral form, whereby the wound portion 41 is formed. FIG. 9 is a schematic diagram depicting the state of the measurement target optical fiber 4 that is fixed to the sample member 10, and illustrates a state where the cylindrical sample member 10 is developed into a plane. In this embodiment, the turn pitch of the optical fiber 4 is 25 mm, and the distance between the turn edge and the edge of the sample member 10 in the axis direction is 10 mm. In the wound portion 41, the measurement target optical fiber 4 is firmly fixed to the circumferential surface of the sample member 10 using epoxy adhesive or the like. In this fixing state, if the outer diameter of the sample member 10 decreases under a high pressure environment, the wound portion 41 shrinks accordingly such that the inner diameter thereof becomes the same as the outer diameter of the sample member 10 after the shrinkage.

Another part of the measurement target optical fiber 4 is bundled at a position where the pressure from the sample member 10 has no influence, and forms a first bundled portion 42. No tension is applied to the first bundled portion 42, just like the case of the free-fiber portion 22 shown in FIG. 2, so that the Brillouin frequency shift amount and the Rayleigh frequency shift amount, solely due to the external pressure applied to the measurement optical fiber 4, can be measured. A first through optical fiber 451 is fused with the first end 43 of the measurement target optical fiber 4, and a second through optical fiber 452 is fused with the second end 44 of the measurement target optical fiber 4 at a fusing portion 4A respectively.

The sample member 10 and the measurement target optical fiber 4 are housed inside a pressure tester 5. The pressure tester 5 is a chamber which can generate, for example, a pressure environment in a 1 to 50 MPa range using hydraulic pressure, and the chamber is filled with oil. The pressure inside the pressure tester 5 is controlled by a pressure control device 5P. The pressure bulk head 51 is disposed at the opening of the pressure tester 5. In the pressure bulk head 51, a feed through 52 penetrates to hold the first and second through optical fibers 451 and 452.

One end of the first and second reference optical fibers 461 and 462 are fused with the other ends of the first and second through optical fibers 451 and 452 at a fusing portion 4B respectively. In an intermediate portion of the first reference optical fiber 461, a second bundled portion 47, in which the optical fibers are bundled, is formed. Furthermore, one end of the first and second lead optical fibers 481 and 482 are fused with the other ends of the first and second reference optical fibers 461 and 462 at a fusing portion 4C respectively. The first bundled portion 42 and the second bundled portion 47 are not directly related to the measurement of the volumetric change of the sample member 10, but are used for measuring temperature, therefore the forming of these bundled portions may be omitted.

The other ends of the first and second lead optical fibers 481 and 482 are connected to a measurement device 6. The measurement device 6 is a measurement device having the functions of the pump light source 27, the probe light source 28 and the detector 29, as shown in FIG. 2. The measurement device 6 allows the pump light to enter the first end 43 of the measurement target optical fiber 4 from the first lead optical fiber 481 side. The measurement device 6 also allows the probe light to enter the second end 44 of the measurement target optical fiber 4 for the Brillouin measurement from the second lead optical fiber 482 side.

<Step S6>

Using the measurement system M2 shown in FIG. 8, test light is allowed to enter the measurement target optical fiber 4 in a state where a known pressure is applied to the measurement target optical fiber 4, and the sample Brillouin measurement to determine the sample Brillouin frequency shift amount based on the Brillouin scattering phenomenon, and the sample Rayleigh measurement to determine the sample Rayleigh frequency shift amount based on the Rayleigh scattering phenomenon are executed for the sample member 10. The temperature is constant at 40° C. The measurement methods for the sample Brillouin measurement and the sample Rayleigh measurement are the same as those of the reference Brillouin measurement and the reference Rayleigh measurement described above.

Figure 10:
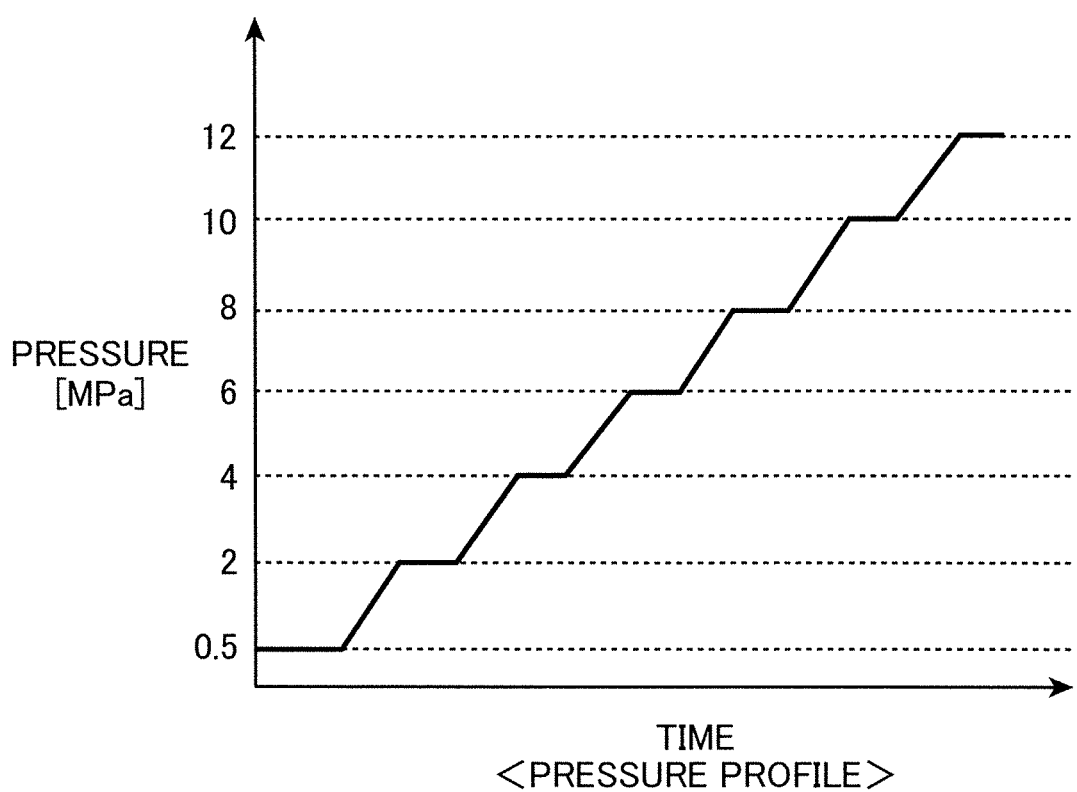
FIG. 10 shows a pressure applying pattern in the measurement system in FIG. 8.

When the sample Brillouin measurement and the sample Rayleigh measurement are performed, the pressure control device 5P controls the internal pressure of the pressure tester 5. FIG. 10 shows the pressure change pattern (pressure profile) executed in this embodiment. Here the pressure was changed in a 2 MPa to 12 MPa range in 2 MPa units, with 0.5 MPa as the reference data. The sustaining time was taken at each pressure level, so as to confirm the stabilization of the response of the measurement target optical fiber 4 to the pressure, then the sample Brillouin measurement and the sample Rayleigh measurement were executed.

<Step S7>

The measurement device 6 determines the Brillouin spectrum of each area portion of the measurement target optical fiber 4 in the longitudinal direction by detecting the stimulated Brillouin scattered light respectively in the sample Brillouin measurement of each pressure level. Based on the Brillouin spectrum of each area portion, the Brillouin frequency shift mount of each area portion (in particular, the wound portion 41) is determined respectively. In the sample Rayleigh measurement under each pressure, the measurement device 6 determines the Rayleigh spectrum of each area portion of the measurement target optical fiber 4 in the longitudinal direction respectively. Then based on the Rayleigh spectrum of each area portion, the measurement device 6 determines the Rayleigh frequency shift amount of each area portion respectively.

Figure 11:
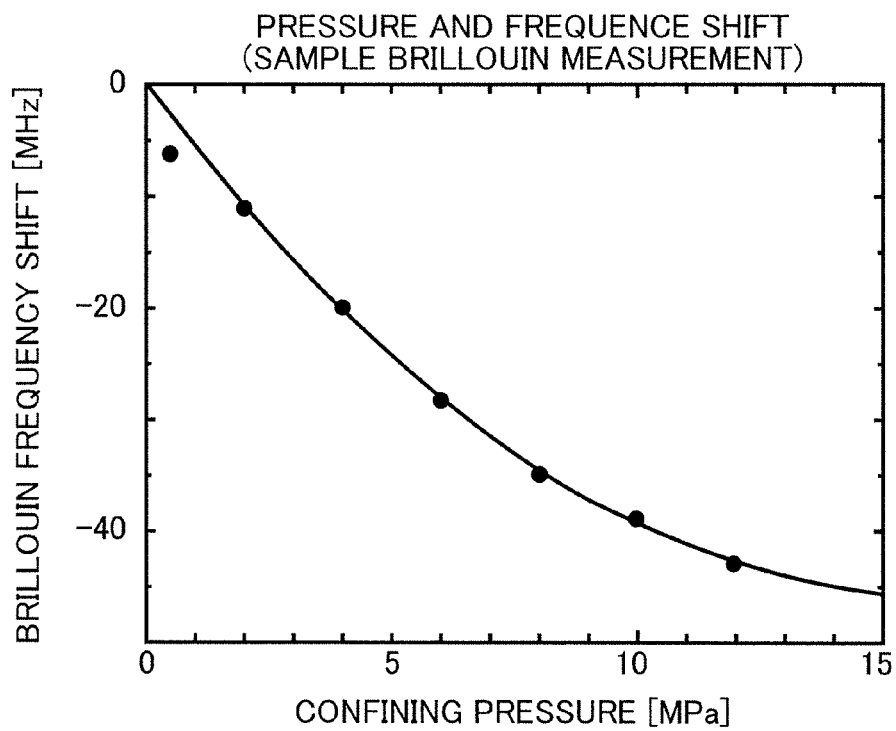
FIG. 11 is a graph showing a relationship of pressure and frequency shift in the sample Brillouin measurement.
Figure 12:
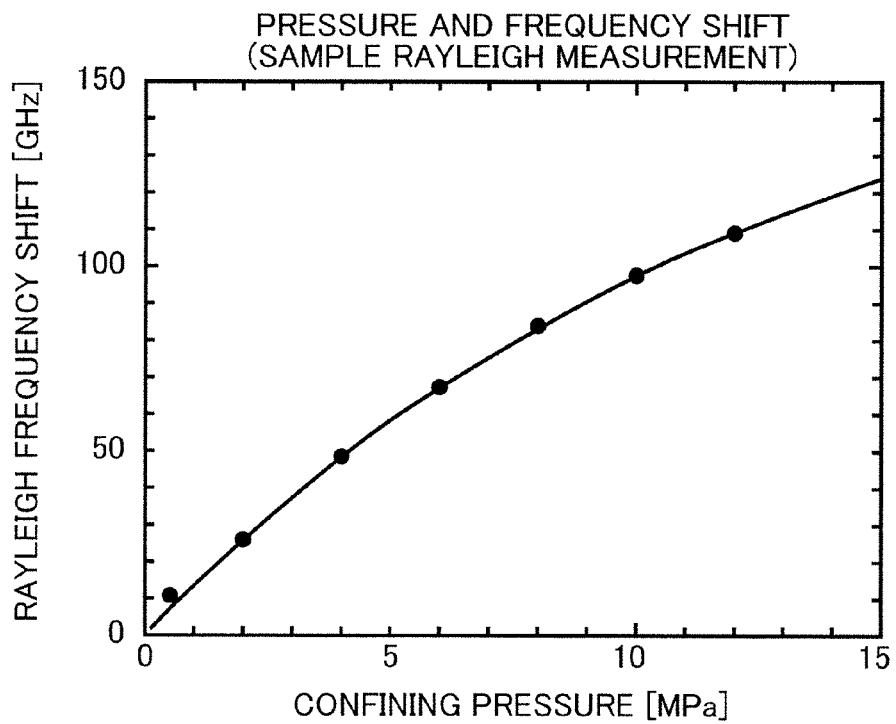
FIG. 12 is a graph showing a relationship of pressure and frequency shift in the sample Rayleigh measurement.

FIG. 11 is a graph showing the correlation of the pressure and the Brillouin frequency shift amount in the sample Brillouin measurement, and FIG. 12 is a graph showing the correlation of the pressure and the Rayleigh frequency shift amount in the sample Rayleigh measurement, which were measured for the wound portion 41 of the measurement target optical fiber 4 using the sample member 10. The relationship of the pressure and the frequency shift is nonlinear for both the sample Brillouin measurement and the sample Rayleigh measurement, probably because the sample member 10 is sandstone having voids. The Brillouin frequency shift amount and the Rayleigh frequency shift amount measured for the first bundled portion 42 were both linear, although this not shown in the graph.

<Step S8>

The volumetric change of the sample member 10 is determined from the sample Brillouin frequency shift amount and the sample Rayleigh frequency shift amount determined in step S7, and from the Brillouin measurement coefficient or the Rayleigh measurement coefficient determined in step S4. As shown in FIG. 11 and FIG. 12, the relationship of the pressure P and the Brillouin frequency shift amount $\Delta v_B$ and the relationship of the pressure P and the Rayleigh frequency shift amount $\Delta v_R$ have been determined for the sample member 10 by the sample Brillouin measurement and the sample Rayleigh measurement. The volumetric strain e of the sample member 10 can be determined by substituting these values and the Brillouin measurement coefficient $\alpha_B$, the Rayleigh measurement coefficient $\alpha_R$, the common coefficient $\beta'$, the strain sensitivity coefficient $C_{11}$ of the Brillouin measurement and the strain sensitivity coefficient $C_{21}$ of the Rayleigh measurement, which were determined in the calibration step, in Expression (7).

Figure 13:
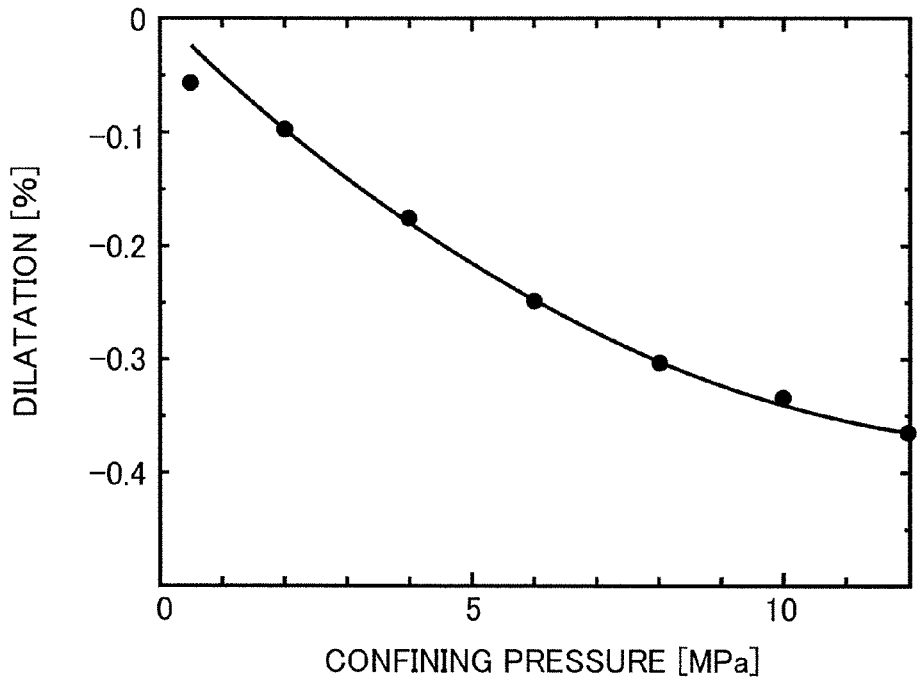
FIG. 13 is a graph showing a relationship of pressure and volumetric strain in the sample Brillouin measurement.
Figure 14:
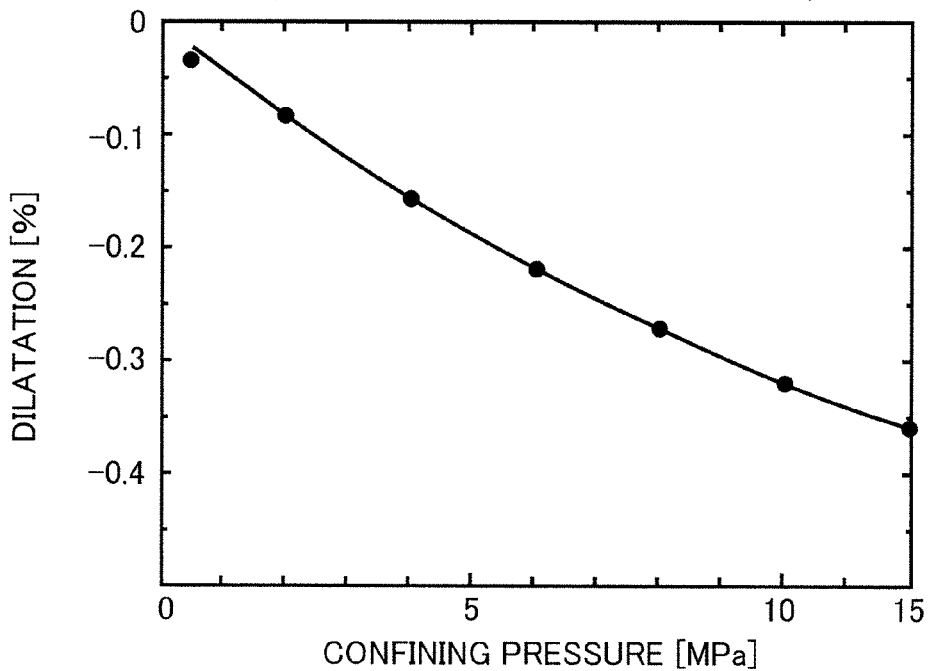
FIG. 14 is a graph showing a relationship of pressure and volumetric strain in the sample Rayleigh measurement.

FIG. 13 is a graph showing the relationship of the pressure (abscissa) and the volumetric strain (ordinate) calculated based on the result of the sample Brillouin measurement. FIG. 14 is a graph showing the relationship of the pressure and the volumetric strain calculated based on the result of the sample Rayleigh measurement. The sample member 10 is sandstone having voids inside, therefore the volume decreases as the pressure increases. The decreasing rate of the volumetric strain is high while sufficient voids exist in the sandstone, but the decreasing rate of the volumetric strain drops as the voids decrease. The results in FIG. 13 and FIG. 14 show this tendency very clearly.

The bulk modulus K of the sample member 10 can be determined by substituting the values of the pressure P and the Brillouin frequency shift amount ΔvB or the pressure P and the Rayleigh frequency shift amount ΔvR, and the Brillouin measurement coefficient αB, the Rayleigh measurement coefficient αR, the common coefficient β', the strain sensitivity coefficient C11 of the Brillouin measurement and the strain sensitivity coefficient C21 of the Rayleigh measurement, which were determined in the calibration step, in Expression (8).

Figure 15:
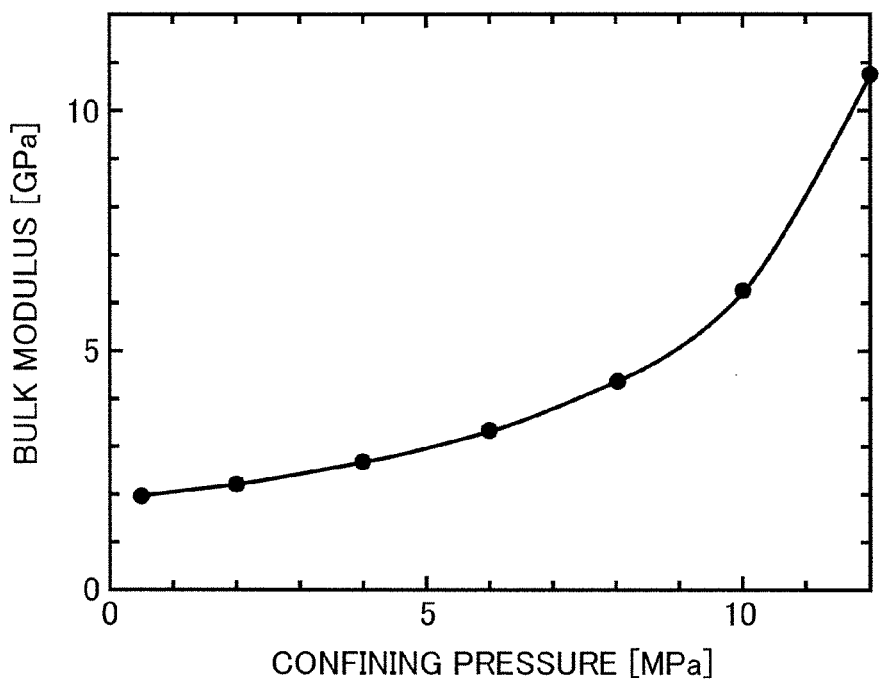
FIG. 15 is a graph showing a relationship of pressure and bulk modulus in the sample Brillouin measurement.
Figure 16:
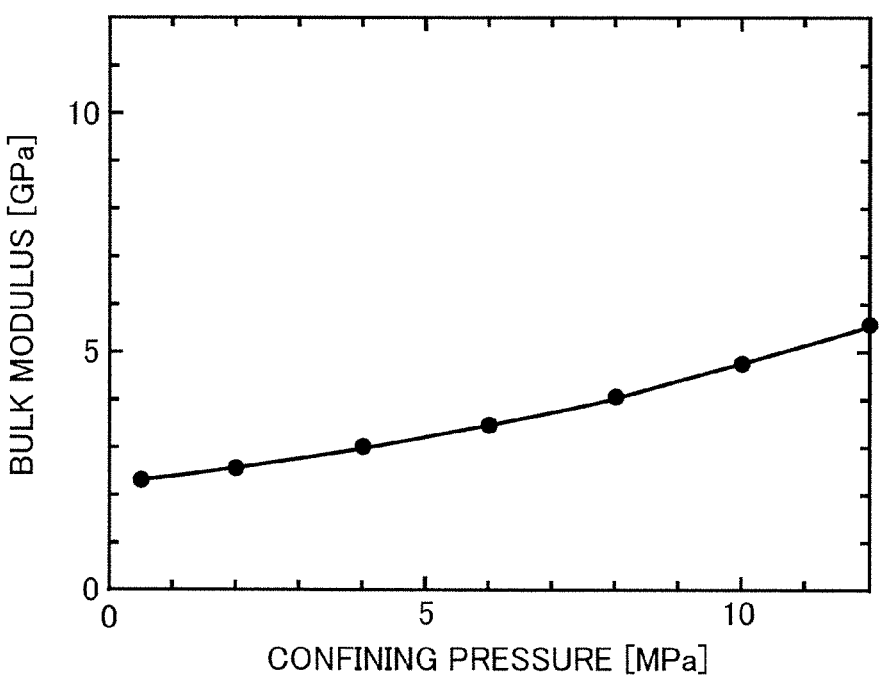
FIG. 16 is a graph showing a relationship of pressure and bulk modulus in the sample Rayleigh measurement.

FIG. 15 is a graph showing the relationship of the pressure (abscissa) and the bulk modulus (ordinate) calculated based on the result of the sample Brillouin measurement. FIG. 16 is a graph showing the relationship of the pressure and the bulk modulus calculated based on the result of the sample Rayleigh measurement. The sample member 10 is sandstone having voids inside, therefore the voids inside the sandstone are crushed as the pressure increases, and rigidity gradually increases, that is, the bulk modulus increases. The results in FIG. 15 and FIG. 16 show this tendency very clearly.

As described above, according to the method for measuring the volumetric change according to this embodiment, the relationship of the volumetric change of the reference member 1 and the frequency shift amount per unit pressure is recognized by the reference Brillouin measurement or the reference Rayleigh measurement. Based on this result, the Brillouin measurement coefficient αB, the Rayleigh measurement coefficient αR and the common coefficient β', to be the calibration data, are determined. Then the similar sample Brillouin measurement or the sample Rayleigh measurement is executed using the sample member 10 so as to determine the Brillouin frequency shift amount ΔvB and the pressure P and the Rayleigh frequency shift amount ΔvR, and these measured values and the coefficients αB, αR and β' are substituted in Expressions (7) and (8), whereby the volumetric strain e and the bulk modulus K (volumetric change) of the sample member 10 can be determined.

<Example of Measuring Volumetric Change Distribution>

Figure 17:
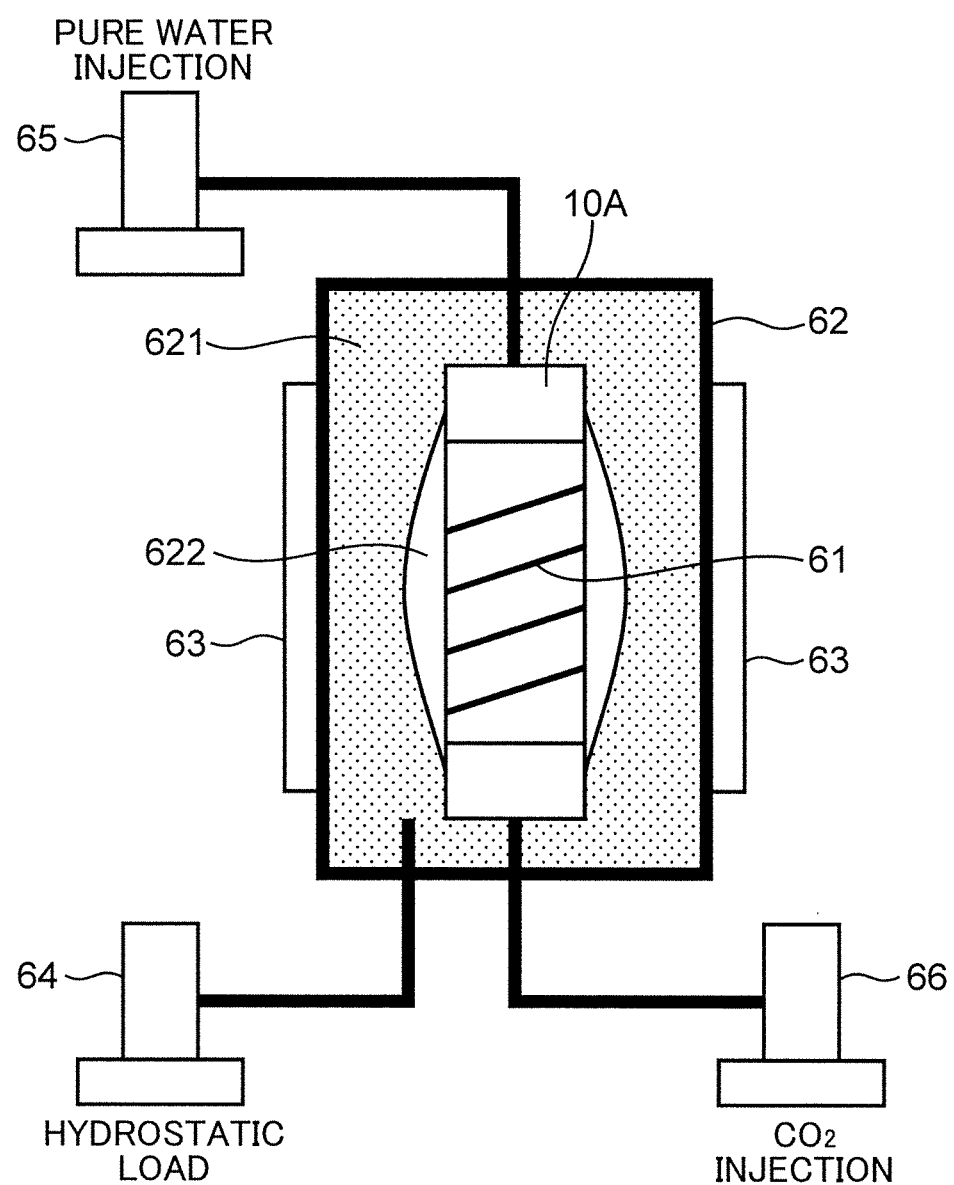
FIG. 17 is a schematic diagram depicting a test device where CO2 in the super-critical state is injected into a sandstone sample.

Now an example of applying the above described method for measuring volumetric changes to measuring the volumetric change distribution of a sandstone sample when $CO_2$ is injected into the sandstone sample will be described. FIG. 17 is a schematic diagram depicting a testing device to inject $CO_2$ in a super-critical state into a sandstone sample 10A having voids, which was extracted in a cylindrical shape, simulating the underground state.

On the outer circumferential surface of the cylindrical sandstone sample 10A, a measurement target optical fiber 61 is wound around in a spiral form. A measurement device that can perform the Rayleigh measurement and the Brillouin measurement (not illustrated) is connected to this measurement target optical fiber 61. The sandstone sample 10A around which the measurement target optical fiber 61 is wound is housed in a pressure vessel 62 in which the confining pressure oil 621 is filled. On the outer circumferential surface of the sandstone sample 10A, a silicon coat layer 622 is formed to prevent the confining pressure oil 621 from entering the sandstone sample 10A. On the outer surface of the pressure vessel 62, a heater 63 for keeping the temperature of the pressure vessel 62 constant is installed.

A first syringe pump 64 for confining the pressure (hydrostatic pressure) load, a second syringe pump 65 for injecting pure water, and a third syringe pump 66 for injecting $CO_2$ are connected to the pressure vessel 62. The first syringe pump 64 is a pump to inject the confining pressure oil into the pressure vessel 62, in order to externally apply pressure to the sandstone sample 10A. The second syringe pump 65 is a pump to inject pure water into the porous sandstone sample 10A. The third syringe pump 66 is a pump to inject $CO_2$ into the sandstone sample 10A in a state of storing pure water, replacing a part of the pure water with $CO_2$.

An example of the test conditions used for the testing device follows. The temperature inside the pressure vessel 62 is kept constant at 40° C. by the heater 63. Initially the first syringe pump 64 is operated to apply 12 MPa of hydrostatic pressure to the sandstone sample 10A inside the pressure vessel 62. Then the second syringe pump 65 is operated to inject pure water into the voids of the sandstone sample 10A at a 10 MPa water injection pressure. Thereby the voids of the sandstone sample 10A are filled with pure water under high pressure, and the state of the sandstone layer, which will store $CO_2$ underground, is simulated.

The third syringe pump 66 is operated while maintaining a 12 MPa hydrostatic pressure and a 10 MPa pure water injection pressure, and super-critical $CO_2$ is injected into the sandstone sample 10A at a 10.05 MPa pressure. By this injection, a part of the pure water inside the sandstone sample 10A is replaced with $CO_2$ in a super-critical state. This state is a simulation of the state where $CO_2$ is injected into a sandstone layer.

Figure 18:
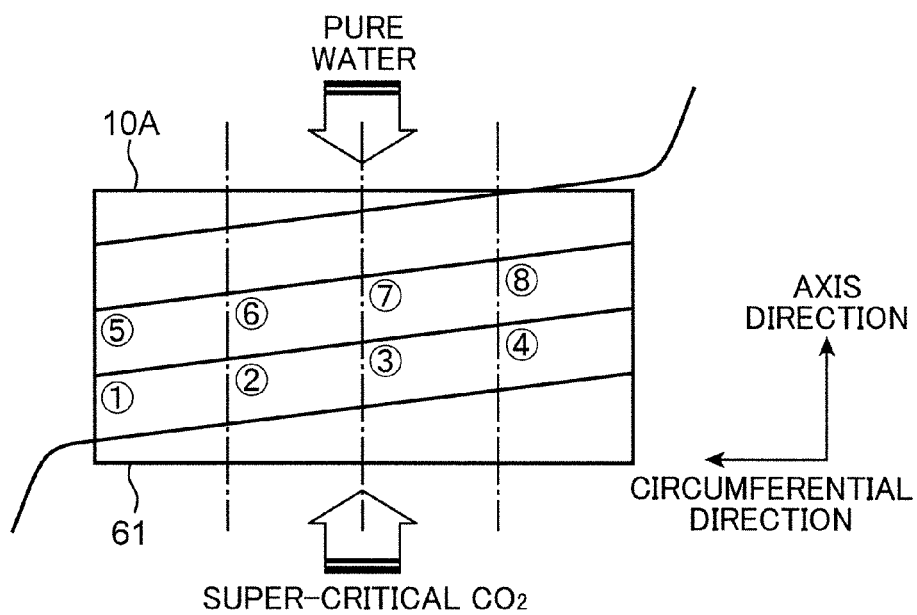
FIG. 18 shows a circumferential surface development of a sandstone sample for indicating the volumetric change measurement points.
Figure 19:
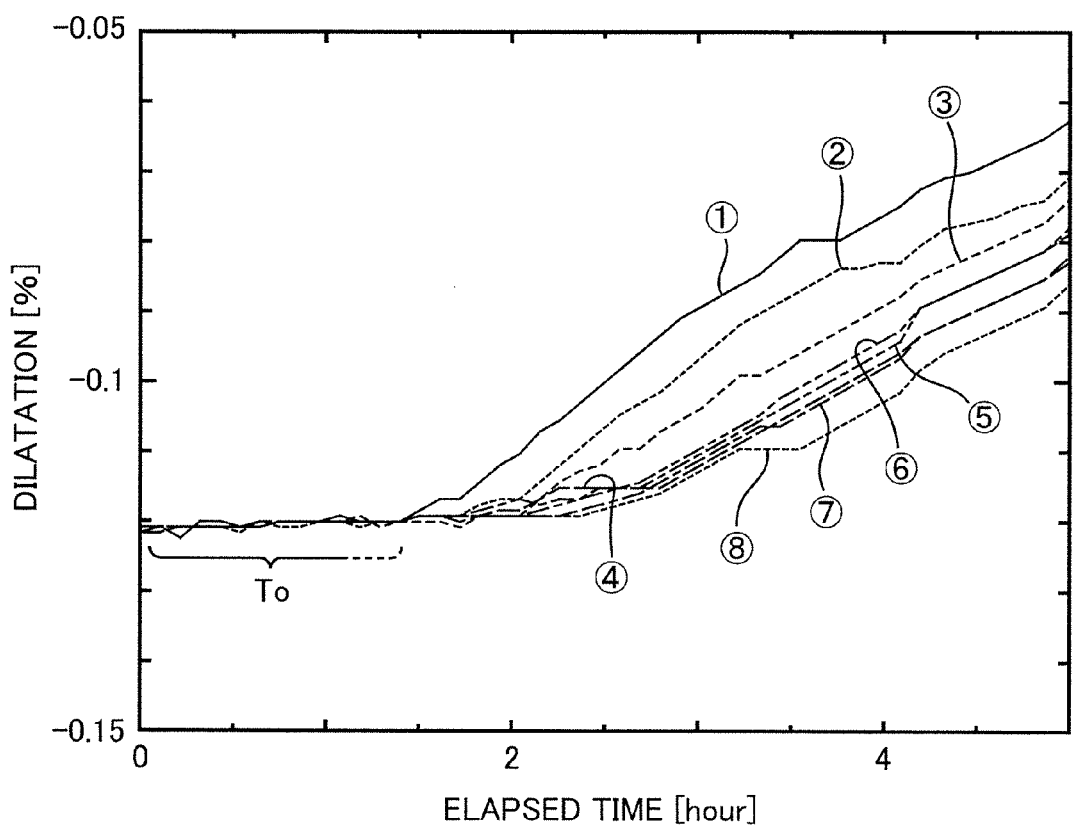
FIG. 19 is a graph showing volumetric change of each measurement point.

While performing this injection operation, the volumetric change distribution of the sandstone sample 10A is measured using the measurement target optical fiber 61 and the measurement device thereof. FIG. 18 is a developed view of the circumferential surface of the sandstone sample 10A to indicate the measurement points, and FIG. 19 is a graph showing the volumetric change at each measurement point. In FIG. 18, a number, from 1 to 8 arranged in a circle, indicates a measurement point. These measurement points 1 to 8 are set in the circumferential direction at a 90° pitch. The measurement target optical fiber 61 is wound around the circumferential surface of the sandstone sample 10A in a spiral form, therefore the measurement point 1 is the furthest upstream, and the measurement point 8 is the furthest downstream, in the super-critical $CO_2$ injection direction, when the measurement points 1 to 8 are viewed in the axis direction of the sandstone sample 10A.

As shown in FIG. 19, it is detected at all the measurement points 1 to 8 that an approximate −0.12% volumetric strain (compression) is generated in the sandstone sample 10A at time zone To before injecting super-critical $CO_2$. After time zone $T_0$, the volumetric strain increases due to the injection of $CO_2$. In other words, the sandstone sample 10A expands (the compressed state is relaxed). The time when the volumetric strain starts to increase is different for each measurement point 1 to 8. In other words, the volumetric strain increase starts first at measurement point 1 at the furthest upstream side in the $CO_2$ injection direction, and starts later as the measurement point becomes closer to the downstream side. This shows the state where the interface between super-critical $CO_2$ and pure water is moving in the sandstone sample 10A toward downstream.

Figure 20:
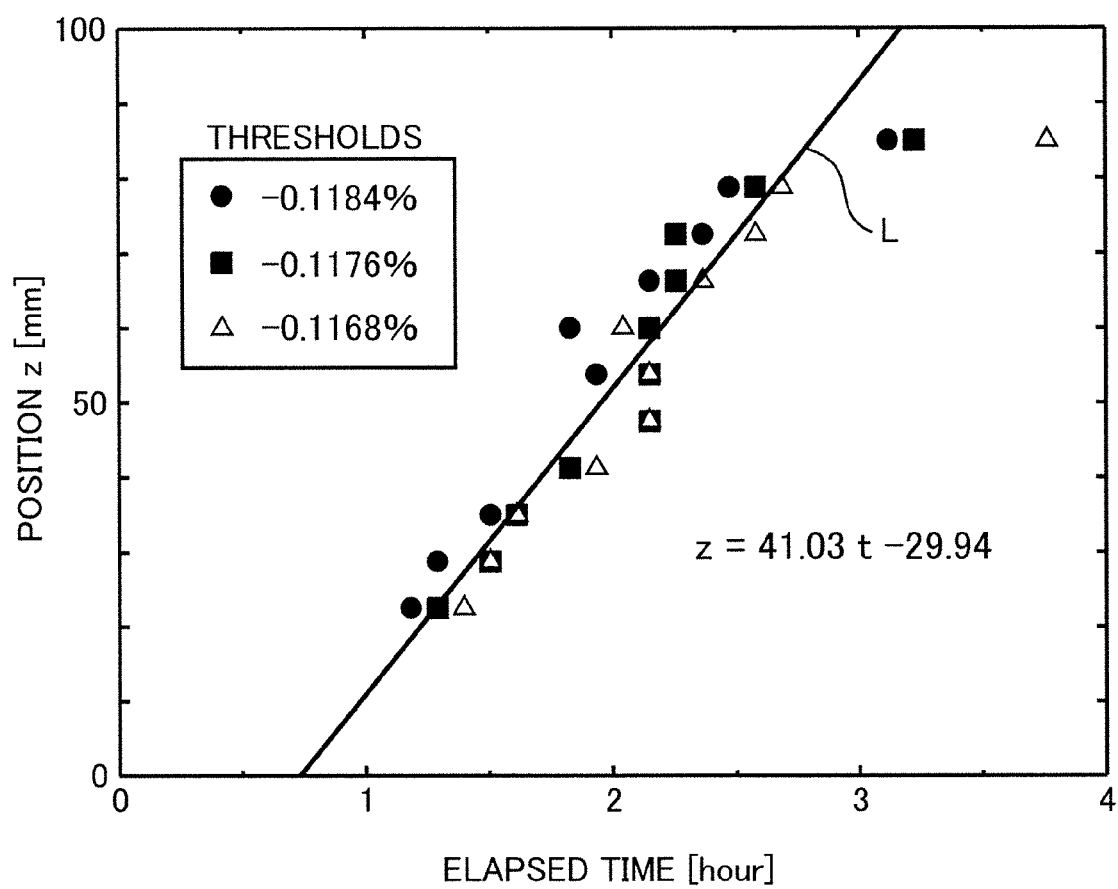
FIG. 20 is a graph evaluating the advancement speed of the interface between the super-critical CO2 and pure water.

FIG. 20 is a graph evaluating the advancing speed of the interface between the super-critical $CO_2$ and the pure water. The ordinate of FIG. 20 indicates a distance z from the $CO_2$ injection end to each measurement point, and the ordinate indicates time when the volumetric strain starts to increase. Three types of thresholds are set and plotted at each measurement point. From this plotting, an approximate line L can be derived. The advancement speed of the interface can be determined by the inclination of the approximate line L (approx. 41 mm/hour).

<Meaning of Using Both Brillouin Measurement and Rayleigh Measurement>

In this embodiment, an example of using both the Brillouin measurement and the Rayleigh measurement was shown. As described above, pressure is known and temperature can easily be kept constant at a laboratory level, therefore in the method for measuring the volumetric changes according to the present invention, the volumetric change of the sample member 10 can be derived by executing at least the reference Brillouin measurement and the sample Brillouin measurement or the reference Rayleigh measurement and the sample Rayleigh measurement.

However in the case of measuring the volumetric changes of sandstone underground, where composition is unknown, for example, the above mentioned measurement under an ideal environment using the testing device, such as the pressure control device 5P, cannot be expected. In other words, an environment where the pressure is generated by one source and an ambient temperature is kept constant cannot be expected. Therefore if both the Brillouin measurement and the Rayleigh measurement are used and data on volumetric changes is acquired using each measurement method, then it is more likely that the pressure factor, other than expansion/contraction that acts on a measurement target sandstone and temperature change factors, can be eliminated. In this sense, it is preferable to use both the Brillouin measurement and the Rayleigh measurement. The advantage of using both measurements will be described with a concrete example.

To separate the influence of pressure P, strain ϵ and temperature T in measurement values, three or more independent measurement amounts are required. In this case, it is sufficient if two types of fiber systems, of which sensitivity to pressure P, strain ϵ and temperature T are different, are provided. This requirement can be satisfied by using both the Brillouin measurement and the Rayleigh measurement. The relationship of the following Expression (11) is established for four frequency shifts, and the change amounts of pressure P, strain ϵ and temperature T acquired by the Brillouin measurement and the Rayleigh measurement.

$$\begin{cases} \Delta v_B^1 = C_{13}^1 \Delta P + C_{12}^1 \Delta T + C_{11}^1 \Delta \\ \Delta v_R^1 = C_{23}^1 \Delta P + C_{22}^1 \Delta T + C_{21}^1 \Delta \\ \Delta v_B^2 = C_{13}^2 \Delta P + C_{12}^2 \Delta T + C_{11}^2 \Delta \\ \Delta v_R^2 = C_{23}^2 \Delta P + C_{22}^2 \Delta T + C_{21}^2 \Delta \end{cases} \quad (11)$$

By solving the simultaneous equations in Expression (11), the influences of pressure P, strain ϵ and temperature T can be separated. In a laboratory experiment, temperature T can be kept constant and pressure P can be freely set in the pressure vessel. Therefore it is not necessary to solve Expression (11). However when measurement is actually performed underground, pressure P, strain ϵ and temperature T are all unknown. As a consequence, the volumetric changes cannot be determined unless a hybrid measurement of the Brillouin measurement and the Rayleigh measurement is performed, and the above simultaneous equations are solved.

Figure 21:
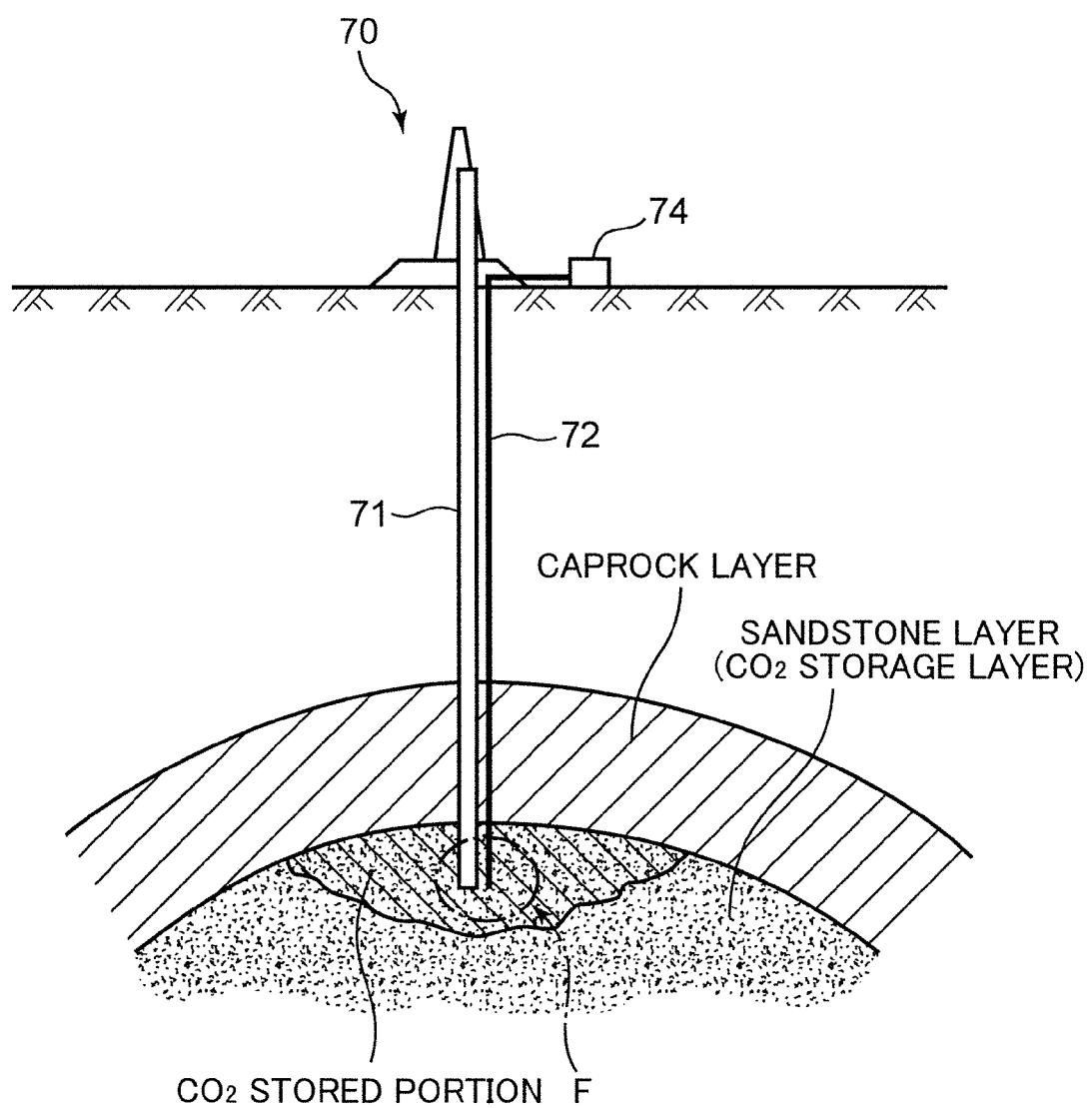
FIG. 21 is a schematic diagram depicting a state of storing CO2 underground and a monitoring system for the stored state.
Figure 22:
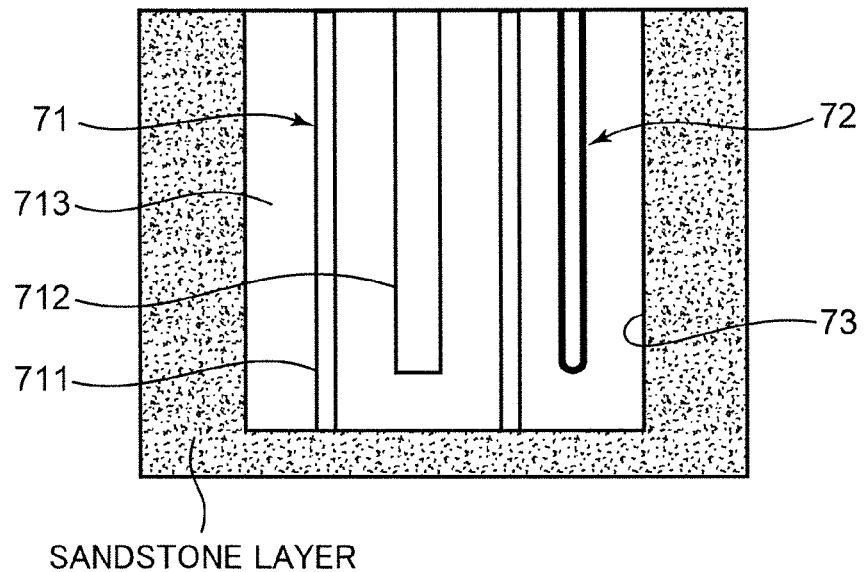
FIG. 22 is an enlarged view of a portion in FIG. 21 indicated by the arrow F.

FIG. 21 is a schematic diagram of a state of storing $CO_2$ underground and a monitoring system for the stored state, and FIG. 22 is an enlarged view of a portion in FIG. 21 indicated by arrow F. Here it is assumed that a sandstone layer, which becomes the layer of storing $CO_2$, exists underground, and a caprock layer, which functions as a sealant layer, exists on the sandstone layer. An injection well 71 is vertically disposed from a storing site 70, which is installed on the ground, toward the sandstone layer underground. The injection well 71 includes a cylindrical casing 711 and a $CO_2$ injection tube 712 disposed inside the casing 711. The injection well 71 is inserted into a pre-drilled bore hole 73, and cementing 713 is performed around the injection well 71 so as to secure the injection well 71 in the underground stratum.

Figure 23:
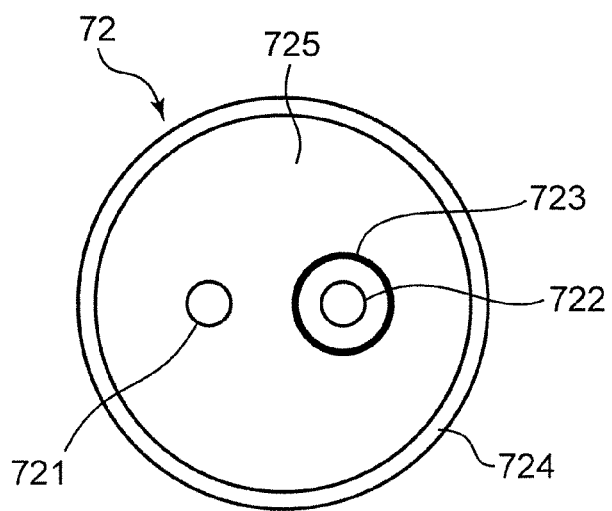
FIG. 23 is a cross-sectional view of a sensor cable.

A sensor cable 72 is laid in the stratum of the cementing 713 in order to measure the pressure P, strain ϵ and temperature T distribution underground along the injection well 71. FIG. 23 shows a cross-sectional structure of the sensor cable 72. The sensor cable 72 includes a first optical fiber 721 which receives the influence of pressure, and a second optical fiber 722 which is isolated from this influence. To be isolated from the pressure, the second optical fiber 722 is loosely housed in a metal capillary tube 723. The first optical fiber 721 and the metal capillary tube 723 are covered by a cable sheath 724, which is an outermost layer of the sensor cable 72, and an interposing layer 725 is disposed inside the cable sheath 724.

The sensor cable 72, which is laid inside the layer of the cementing 713, is influenced if the volumetric change is generated in the peripheral stratum. For example, if the sandstone layer expands due to the injection of $CO_2$, the sensor cable 72 receives the pressure via the layer of the cementing 713. In this case, the first optical fiber 721 is influence by the pressure, but the second optical fiber 722 housed inside the metal capillary tube 723 is not.

For each of the first optical fiber 721 and the second optical fiber 722, the measurement device 74 installed on the ground performs the Brillouin measurement and the Rayleigh measurement, and determines the Brillouin frequency shift and the Rayleigh frequency shift. When this sensor cable 72 is used, the simultaneous equations that separate the influence of pressure P, strain ϵ and temperature T become the following Expression (12). Since the second optical fiber 722 is cut off from the pressure influence, this expression is simpler than the Expression (11).

$$\begin{cases} \Delta v_B^1 = C_{13}^1 \Delta P + C_{12}^1 \Delta T + C_{11}^1 \Delta \varepsilon^1 \\ \Delta v_R^1 = C_{23}^1 \Delta P + C_{22}^1 \Delta T + C_{21}^1 \Delta \varepsilon^1 \\ \Delta v_B^2 = \phantom{C_{13}^2 \Delta P +} C_{12}^2 \Delta T + C_{11}^2 \Delta \varepsilon^2 \\ \Delta v_R^2 = \phantom{C_{23}^2 \Delta P +} C_{22}^2 \Delta T + C_{21}^2 \Delta \varepsilon^2 \end{cases} \quad (12)$$

By solving the simultaneous equations of Expression (12), factors other than the volumetric changes of the stratum can be eliminated, and the volumetric change of the sandstone layer due to the injection of $CO_2$, the distribution of the volumetric change and the soundness of the caprock layer can be monitored.

The above described embodiment primarily includes the invention having the following configuration.

A method for measuring the volumetric changes of an object according to an aspect of the present invention includes: a step of fixing an optical fiber to a reference member, the volumetric change of which is known, so as to follow deformation of the reference member when pressure is externally applied to the reference member; a step of allowing test light to enter the optical fiber in a state of externally applying a known pressure to the reference member on which the optical fiber is fixed, and performing at least one of a reference Brillouin measurement for determining a reference Brillouin frequency shift amount based on the Brillouin scattering phenomenon, and a reference Raleigh measurement for determining a reference Rayleigh frequency shift amount based on the Rayleigh scattering phenomenon; a step of determining, from the result of the reference Brillouin measurement or the reference Rayleigh measurement, a Brillouin measurement coefficient or a Rayleigh measurement coefficient based on the relationship between the volumetric change and the frequency shift amount per unit pressure in each measurement; a step of fixing an optical fiber to a sample member, the volumetric change of which is unknown, so as to follow the deformation of the sample member when pressure is externally applied to the sample member; a step of allowing test light to enter the optical fiber in a state of externally applying a known pressure to the sample member to which the optical fiber is fixed, and performing at least one of a sample Brillouin measurement for determining a sample Brillouin frequency shift amount based on the Brillouin scattering phenomenon, and a sample Rayleigh measurement for determining a sample Rayleigh frequency shift amount based on the Rayleigh scattering phenomenon; and a step of determining the volumetric changes of the sample member from the sample Brillouin frequency shift amount or the sample Rayleigh frequency shift amount, and the Brillouin measurement coefficient or the Rayleigh measurement coefficient.

According to this measurement method, the relationship of a volumetric change of the reference member and the frequency shift amount per unit pressure is recognized by the reference Brillouin measurement or the reference Rayleigh measurement. Based on this result, the Brillouin measurement coefficient or the Rayleigh measurement coefficient to be the calibration data is determined. Then the volumetric change of the sample member can be determined by executing a similar sample Brillouin measurement or a sample Rayleigh measurement for the sample member to determine the frequency shift amount, and applying the Brillouin measurement coefficient or the Rayleigh measurement coefficient to the frequency shift amount.

In this configuration, it is preferable that the step of performing the reference Brillouin measurement or the reference Rayleigh measurement includes: a first measurement that allows test light to enter the optical fiber in a state of not being fixed to the reference member, and measures the reference Brillouin frequency shift amount or the reference Rayleigh frequency shift amount; and a second measurement that measures the reference Brillouin frequency shift amount or the reference Rayleigh frequency shift amount for optical fibers which are fixed to at least two types of reference members constituted by different materials, and the step of determining the Brillouin measurement coefficient or the Rayleigh measurement coefficient is a step of determining an inclination and an intercept of a linear function acquired by plotting, on an axis of the volumetric change, the frequency shift amount per unit pressure based on the reference Brillouin frequency shift amount or the reference Rayleigh frequency shift amount acquired in the first measurement and the second measurement.

According to this configuration, at least three types of reference Brillouin frequency shift amounts or reference Rayleigh frequency shift amounts are determined from the optical fiber in a state of not being fixed to the reference member and optical fibers fixed to at least two different types of reference members. Therefore the relationship of the volumetric change and the frequency shift amount per unit pressure can be expressed as a linear function, and the Brillouin measurement coefficient or the Rayleigh measurement coefficient can be determined as an inclination and an intercept of the linear function. Thereby the coefficients can be derived easily and accurately.

In this configuration, it is preferable that the step of fixing an optical fiber to the reference member includes a step of winding a part of one optical fiber around a cylindrical reference member, and forming a free-fiber portion where another part of the optical fiber is separated from the reference member, and the step of performing the reference Brillouin measurement or the reference Rayleigh measurement includes a step of enclosing the wound portion, where the optical fiber is wound around the reference member, and the free-fiber portion in a pressure vessel.

According to this configuration, the first measurement and the second measurement can be executed by one measurement, and measurement efficiency can be improved.

In this configuration, it is preferable that the sample member is a heterogenous porous member, and the step of determining the volumetric change of the sample member is a step of determining a bulk modulus and a volumetric expansion ratio of the sample member.

According to this invention, a method for measuring the volumetric changes of an object, which can accurately measure a volumetric changes and distribution thereof of an object, of which degree of volumetric changes and distribution thereof are unknown, can be provided. Therefore a filling rate of a fluid into a porous sandstone and a distribution thereof, for example, can be determined. Because of this, the present invention can contribute to constructing a system to monitor a state of storing $CO_2$ in sandstone when $CO_2$ is stored underground, and can also measure the volumetric change distribution of the caprock layer which functions as a sealant layer.

The invention claimed is:

1. A method for measuring volumetric changes of an object, comprising:

fixing an optical fiber to a reference member, the volumetric change of which is known, so as to follow deformation of the reference member when pressure is externally applied to the reference member;

allowing test light to enter the optical fiber in a state of externally applying a known pressure to the reference member to which the optical fiber is fixed, and performing at least one of a reference Brillouin measurement for determining a reference Brillouin frequency shift amount based on the Brillouin scattering phenomenon, and a reference Raleigh measurement for determining a reference Rayleigh frequency shift amount based on the Rayleigh scattering phenomenon;

determining, from the result of the reference Brillouin measurement or the reference Rayleigh measurement, a Brillouin measurement coefficient or a Rayleigh measurement coefficient based on the relationship between the volumetric change and the frequency shift amount per unit pressure in each measurement;

fixing an optical fiber to a sample member, the volumetric change of which is unknown, so as to follow deformation of the sample member when pressure is externally applied to the sample member;

allowing test light to enter the optical fiber in a state of externally applying a known pressure to the sample member to which the optical fiber is fixed, and performing at least one of a sample Brillouin measurement for determining a sample Brillouin frequency shift amount based on the Brillouin scattering phenomenon, and a sample Rayleigh measurement for determining a sample Rayleigh frequency shift amount based on the Rayleigh scattering phenomenon; and determining the volumetric changes of the sample member from the sample Brillouin frequency shift amount or the sample Rayleigh frequency shift amount, and the Brillouin measurement coefficient or the Rayleigh measurement coefficient.

2. The method for measuring volumetric changes of an object according to claim 1, wherein the sample member is a heterogenous porous member, and the step of determining the volumetric change of the sample member is a step of determining a bulk modulus and a volumetric expansion ratio of the sample member.

3. The method for measuring volumetric changes of an object according to claim 1, wherein the step of performing the reference Brillouin measurement or the reference Rayleigh measurement includes:

a first measurement that allows test light to enter the optical fiber in a state of not being fixed to the reference member, and measures the reference Brillouin frequency shift amount or the reference Rayleigh frequency shift amount; and a second measurement that measures the reference Brillouin frequency shift amount or the reference Rayleigh frequency shift amount for optical fibers which are fixed to at least two types of reference members constituted by different materials, and the step of determining the Brillouin measurement coefficient or the Rayleigh measurement coefficient is a step of determining an inclination and an intercept of a linear function acquired by plotting, on an axis of the volumetric change, the frequency shift amount per unit pressure based on the reference Brillouin frequency shift amount or the reference Rayleigh frequency shift amount acquired in the first measurement and the second measurement.

4. The method for measuring volumetric changes of an object according to claim 3, wherein the step of fixing an optical fiber to the reference member includes a step of winding a part of one optical fiber around a cylindrical reference member, and forming a free-fiber portion where another part of the optical fiber is separated from the reference member, and the step of performing the reference Brillouin measurement or the reference Rayleigh measurement includes a step of enclosing the wound portion, where the optical fiber is wound around the reference member, and the free-fiber portion in a pressure vessel.

* * * * *